(12) United States Patent
Li et al.

(10) Patent No.: US 12,081,296 B2
(45) Date of Patent: Sep. 3, 2024

(54) CARRIER AGGREGATION CAPABILITY REPORTING APPARATUS AND METHOD, AND CARRIER MEASUREMENT APPARATUS AND METHOD

(71) Applicant: Huawei Technologies Co., Ltd., Shenzhen (CN)

(72) Inventors: Bingzhao Li, Beijing (CN); Xiaodong Yang, Shenzhen (CN); Wei Quan, Beijing (CN); Zhenxing Hu, Shenzhen (CN); Jian Zhang, Beijing (CN); Jinhua Miao, Beijing (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 621 days.

(21) Appl. No.: 15/813,918

(22) Filed: Nov. 15, 2017

(65) Prior Publication Data

US 2018/0076872 A1 Mar. 15, 2018

Related U.S. Application Data

(63) Continuation of application No. PCT/CN2015/087098, filed on Aug. 14, 2015.

(30) Foreign Application Priority Data

May 15, 2015 (WO) ................ PCT/CN2015/079067

(51) Int. Cl.
*H04B 7/06* (2006.01)
*H04B 7/0417* (2017.01)
(Continued)

(52) U.S. Cl.
CPC ......... *H04B 7/0626* (2013.01); *H04B 7/0417* (2013.01); *H04W 24/10* (2013.01); *H04W 72/21* (2023.01); *H04W 72/51* (2023.01)

(58) Field of Classification Search
CPC ... H04B 7/0417; H04B 7/0626; H04W 24/10; H04W 72/0413; H04W 72/048
See application file for complete search history.

(56) References Cited

U.S. PATENT DOCUMENTS

| 8,639,239 B2 * | 1/2014 | Uemura | H04W 36/0088 455/67.11 |
|---|---|---|---|
| 9,084,148 B2 * | 7/2015 | Uemura | H04W 24/08 |

(Continued)

FOREIGN PATENT DOCUMENTS

| CN | 101043708 A | 9/2007 |
|---|---|---|
| CN | 101345647 A | 1/2009 |

(Continued)

OTHER PUBLICATIONS

"Signalling of UE-supported Band Combinations," 3GPP TSG-RAN WG2 #85bis, Tdoc R2-141494, Valencia, Spain, 3rd Generation Partnership Project, Valbonne, France (Mar. 31-Apr. 4, 2014).

(Continued)

*Primary Examiner* — Khaled M Kassim
(74) *Attorney, Agent, or Firm* — Leydig, Voit & Mayer, Ltd.

(57) ABSTRACT

A carrier aggregation capability reporting apparatus and method are disclosed, so as to prevent a user equipment (UE) from repeatedly reporting capability information corresponding to a carrier combination supported by the UE, and to reduce waste of signaling resources used for reporting. The method includes: determining, by the UE, information about a carrier combination supported by the UE and information about a sub-combination that is of the carrier combination and that is supported by the UE; and reporting, by the UE to a base station, the determined information about the carrier combination supported by the UE and the (Continued)

determined information about the sub-combination that is of the carrier combination and that is supported by the UE.

18 Claims, 9 Drawing Sheets

(51) Int. Cl.
*H04W 24/10* (2009.01)
*H04W 72/21* (2023.01)
*H04W 72/51* (2023.01)

(56) References Cited

U.S. PATENT DOCUMENTS

| | | | |
|---|---|---|---|
| 9,548,850 B2* | 1/2017 | Pedersen | H04L 5/006 |
| 10,177,891 B2* | 1/2019 | Sayenko | H04L 5/0094 |
| 10,425,848 B2* | 9/2019 | Sun | H04L 1/0027 |
| 2008/0317152 A1* | 12/2008 | Sun | H04L 1/1893 |
| | | | 375/261 |
| 2010/0267394 A1* | 10/2010 | Wu | H04W 24/10 |
| | | | 455/450 |
| 2011/0237202 A1* | 9/2011 | Uemura | H04W 36/0088 |
| | | | 455/67.14 |
| 2011/0267978 A1* | 11/2011 | Etemad | H04L 5/0094 |
| | | | 370/254 |
| 2011/0319069 A1* | 12/2011 | Li | H04W 8/22 |
| | | | 455/422.1 |
| 2012/0083309 A1* | 4/2012 | Kwon | H04B 17/24 |
| | | | 455/522 |
| 2012/0113866 A1* | 5/2012 | Tenny | H04W 24/10 |
| | | | 370/254 |
| 2012/0243450 A1* | 9/2012 | Ishii | H04L 5/001 |
| | | | 370/329 |
| 2012/0320843 A1* | 12/2012 | Kim | H04W 72/23 |
| | | | 370/329 |
| 2012/0327878 A1* | 12/2012 | Pedersen | H04L 5/006 |
| | | | 370/329 |
| 2013/0070720 A1 | 3/2013 | Pan et al. | |
| 2013/0215736 A1* | 8/2013 | Han | H04W 24/10 |
| | | | 370/216 |
| 2013/0242796 A1* | 9/2013 | Chen | H04L 5/001 |
| | | | 370/252 |
| 2014/0140318 A1* | 5/2014 | Uemura | H04W 8/24 |
| | | | 370/330 |
| 2014/0162642 A1* | 6/2014 | Kwon | H04W 56/00 |
| | | | 455/435.1 |
| 2014/0169343 A1* | 6/2014 | Skov | H04L 5/003 |
| | | | 370/336 |
| 2014/0248917 A1 | 9/2014 | Scipione et al. | |
| 2014/0370905 A1 | 12/2014 | Kim et al. | |
| 2015/0023194 A1 | 1/2015 | Seo et al. | |
| 2015/0124638 A1 | 5/2015 | Sun et al. | |
| 2015/0264637 A1* | 9/2015 | Zaus | H04W 48/16 |
| | | | 455/434 |
| 2015/0324690 A1* | 11/2015 | Chilimbi | G06N 3/063 |
| | | | 706/27 |
| 2016/0080094 A1* | 3/2016 | Kim | H04W 72/541 |
| | | | 455/63.1 |
| 2016/0173214 A1 | 6/2016 | Takahashi et al. | |
| 2016/0255601 A1* | 9/2016 | Axmon | H04W 72/121 |
| | | | 370/336 |
| 2016/0270139 A1* | 9/2016 | Rahman | H04W 76/15 |
| 2016/0374069 A1* | 12/2016 | Palm | H04W 72/51 |
| 2017/0041059 A1* | 2/2017 | Yi | H04B 7/024 |
| 2017/0179984 A1* | 6/2017 | Kim | H04B 1/10 |
| 2017/0303283 A1* | 10/2017 | Ng | H04L 5/001 |
| 2018/0184433 A1* | 6/2018 | Kim | H04J 11/00 |
| 2018/0191414 A1* | 7/2018 | Suzuki | H04W 16/28 |
| 2018/0206113 A1* | 7/2018 | He | H04W 8/24 |
| 2019/0373540 A1* | 12/2019 | Zaus | H04W 8/22 |

FOREIGN PATENT DOCUMENTS

| | | |
|---|---|---|
| CN | 101873646 A | 10/2010 |
| CN | 101873648 A | 10/2010 |
| CN | 101965692 A | 2/2011 |
| CN | 102006664 A | 4/2011 |
| CN | 102082636 A | 6/2011 |
| CN | 102300328 A | 12/2011 |
| CN | 102340873 A | 2/2012 |
| CN | 102595475 A | 7/2012 |
| CN | 102612133 A | 7/2012 |
| CN | 103329458 A | 9/2013 |
| CN | 103580781 A | 2/2014 |
| CN | 103974432 A | 8/2014 |
| EP | 2422454 A1 | 2/2012 |
| JP | 2007124578 A | 5/2007 |
| JP | 2012204910 A | 10/2012 |
| WO | 2010121567 A1 | 10/2010 |
| WO | 2014005386 A1 | 1/2014 |
| WO | 2014133321 A1 | 9/2014 |
| WO | 2015016177 A1 | 2/2015 |

OTHER PUBLICATIONS

"Selective UE capability reporting," 3GPP TSG-RAN WG2#86, R2-142435, Seoul, South Korea, 3rd Generation Partnership Project, Valbonne, France (May 19-23, 2014).
"3rd Generation Partnership Project;Technical Specification Group Radio Access Network;Evolved Universal Terrestrial Radio Access (E-UTRA);Radio Resource Control (RRC);Protocol specification(Release 12)," 3GPP TS 36.331 V12.5.0,3rd Generation Partnership Project, Valbonne, France (Mar. 2015).
CN/201580076925.7, Office Action, Apr. 24, 2019.
"Additional MIMO/CSI capability for intra-band contiguous CA," 3GPP TSG-RAN WG2 #89bis, Bratislava, Slovakia, R2-151690, total 21 pages, 3rd Generation Partnership Project, Valbonne, France (Apr. 20-24, 2015).
CN/202110188081.2, Office Action/Search Report, Jan. 4, 2022.
U.S. Appl. No. 16/731,842, filed Dec. 31, 2019.

* cited by examiner

CARRIER AGGREGATION CAPABILITY REPORTING APPARATUS AND METHOD, AND CARRIER MEASUREMENT APPARATUS AND METHOD

CROSS-REFERENCE TO RELATED APPLICATIONS

This application is a continuation of International Application No. PCT/CN2015/087098, filed on Aug. 14, 2015, which claims priority to International Application No. PCT/CN2015/079067, filed on May 15, 2015. The disclosures of the aforementioned applications are hereby incorporated by reference in their entireties.

TECHNICAL FIELD

Embodiments of the present invention relate to the field of wireless communications, and in particular, to a carrier aggregation capability reporting apparatus and method, and a carrier measurement apparatus and method.

BACKGROUND

A Long Term Evolution (LTE for short) system needs to provide transmission bandwidth of a maximum of 100 MHZ, so that a downlink transmission peak speed can reach 1 Gbps, and an uplink transmission peak speed can reach 500 Mbps. To resolve a scarcity of a contiguous spectrum of high bandwidth, a carrier aggregation (CA for short) scheme is proposed in the LTE system. Carrier aggregation means that two or more component carriers (CC for short) are aggregated to support higher transmission bandwidth. Maximum transmission bandwidth may reach 100 MHz.

At present, in the carrier aggregation scheme, a user equipment (UE for short) needs to report a carrier aggregation capability to a base station. The carrier aggregation capability includes capability information of a carrier combination supported by the UE, and the capability information may specifically include information such as a quantity and bandwidth of aggregation carriers in the carrier combination supported by the UE, whether the aggregation carriers are contiguous carriers, and a multiple-input multiple-output (MIMO for short) capability corresponding to each carrier.

In an existing reporting mechanism, the UE needs to report information about each carrier combination supported by the UE to the base station, and indicate capability information corresponding to the carrier combination. If the UE supports a high-level aggregation capability, it cannot implicitly indicate that the UE supports a low-level aggregation capability. Therefore, even if the UE separately reports information about two carrier combinations supported by the UE to the base station, and one carrier combination (corresponding to a low-level aggregation capability) is a sub-combination of the other carrier combination (corresponding to a high-level aggregation capability), the UE still needs to perform reporting for each carrier combination. If the two carrier combinations are corresponding to same capability information, the UE performs repeated reporting, and signaling resources used for reporting are wasted. For example, the UE supports BAND_A (two contiguous carriers)+BAND_B (one carrier), but it cannot implicitly indicate that the UE supports BAND_A (one contiguous carrier)+BAND_B (one carrier). BAND_A (one contiguous carrier)+BAND_B (one carrier) is a sub-combination of BAND_A (two contiguous carriers)+BAND_B (one carrier) supported by the UE. If the UE supports BAND_A (one contiguous carrier)+BAND_B (one carrier), the UE needs to separately report, to the base station, information indicating that the UE supports BAND_A (one contiguous carrier)+BAND_B (one carrier).

In the existing reporting mechanism, when the UE reports the capability information of the carrier combination supported by the UE to the base station, the UE can report only the lowest capability in capabilities corresponding to carriers in the carrier combination because the carriers in the carrier combination are corresponding to different capabilities, for example, different MIMO capabilities, or different channel state information (CSI for short) capabilities. The MIMO capability is used as an example. If the carrier combination supported by the UE includes two carriers, one carrier supports four-layer MIMO, and the other carrier supports eight-layer MIMO, the UE can report only a four-layer MIMO capability. In this reporting mechanism, the base station cannot thoroughly learn capabilities of carriers supported by the UE.

In another prior art, the UE may report, in a first set (supported Band Combination) and a second set (supported Band Combination Add), a capability of a carrier combination supported by the UE. The capability of the carrier combination includes a single-carrier capability and a multi-carrier capability. Each element in the first set or the second set indicates, according to a first format, a carrier combination supported by the UE and a capability corresponding to the carrier combination, such as a MIMO capability or a CSI capability. For example, an element is a combination of a frequency band 1 and a frequency band 2, and in the combination, the frequency band 1 supports aggregation of two carriers, and the frequency band 2 supports aggregation of two carriers. Only one MIMO capability corresponding to the element is that four carriers each support 2×2 MIMO, and a CSI capability corresponding to the element is that CSI of each carrier supports two processes. When the UE receives a capability reporting request from the base station, if the request does not carry a reporting indication for a specific frequency band, the UE fills a carrier aggregation capability of the UE in the first set, and reports the carrier aggregation capability. If the first set cannot accommodate all UE capabilities, the UE does not report a UE capability that cannot be accommodated by the first set. If the request carries a reporting indication for a specified frequency band, the UE first fills, in the first set, a carrier aggregation capability of the UE within a range of the specified frequency band. If the first set cannot accommodate all UE capabilities within the range of the specified frequency band, the UE fills a remaining capability in the second set, and reports the remaining capability. If the second set cannot accommodate all the remaining UE capabilities, the UE does not report a UE capability that cannot be accommodated by the second set. At present, a UE capability is stored in a serving base station and an MME (mobility management entity) of the UE after being reported. After the UE moves, the serving base station or the MME transfers the UE capability to a new serving base station. In this reporting manner, a format of an element in a set cannot be changed. If the format is changed, the UE capability cannot be reported by using the first set and the second set, and consequently, evolution of the UE capability is limited.

When working in a carrier aggregation scenario, the UE measures a frequency of an aggregation carrier according to a measurement control message delivered by a network side. Measurement may be classified into intra-frequency frequency measurement and inter-frequency frequency measurement according to different carriers on which measured frequencies are located. When a carrier on which a frequency measured by the UE is located is different from a carrier on which a serving cell is located, measurement performed by the UE is referred to as the inter-frequency frequency measurement. The UE performs the inter-frequency frequency measurement in a measurement gap configured by the base station. In the measurement gap, the base station does not schedule the UE, and the UE temporarily interrupts communication with the serving cell, and performs the inter-frequency frequency measurement. However, at present, when performing the inter-frequency frequency measurement, the UE is allowed to parallelly measure a maximum of three inter-frequencies. A quantity of frequencies measured by the UE is limited, and consequently, work efficiency of the UE is reduced.

SUMMARY

Embodiments of the present invention provide a carrier aggregation capability reporting apparatus and method, so as to prevent UE from repeatedly reporting capability information corresponding to a carrier combination supported by the UE, and reduce waste of signaling resources used for reporting.

According to a first aspect, an embodiment of the present invention provides a carrier aggregation capability reporting apparatus, including:
  a processing module, configured to determine information about a carrier combination supported by user equipment UE in which the apparatus is located and information about a sub-combination that is of the carrier combination and that is supported by the UE; and
  a transceiver module, configured to report, to a base station, the information about the carrier combination supported by the UE and the information about the sub-combination that is of the carrier combination and that is supported by the UE, where the information about the carrier combination and the information about the sub-combination are determined by the processing module.

With reference to the first aspect, in a first implementation, capability information of the sub-combination of the carrier combination is the same as capability information of the carrier combination, and the capability information includes a multiple-input multiple-output MIMO capability and/or a channel state information CSI capability.

With reference to the first implementation of the first aspect, in a second implementation of the first aspect,
  the processing module is further configured to:
  determine, in sub-combinations of the carrier combination that are supported by the UE, a sub-combination that has different capability information from the capability information of the carrier combination, and determine information about the sub-combination and the capability information of the sub-combination; and
  the transceiver module is further configured to:
  separately report the information about the sub-combination and the capability information of the sub-combination that are determined by the processing module to the base station.

With reference to the first aspect, in a third implementation, the apparatus further includes:
  a storage module, configured to store a sequence number that is predefined by the storage module and the base station and that is corresponding to each sub-combination of the carrier combination, where the processing module is further configured to:
  according to the sequence number stored in the storage module, separately set, to a first value, a bit of a sequence number corresponding to a sub-combination that is of the carrier combination and that is supported by the UE, and set, to a second value, a bit of a sequence number corresponding to a sub-combination that is of the carrier combination and that is not supported by the UE; and
when reporting the information, determined by the processing module, about the sub-combination that is of the carrier combination and that is supported by the UE to the base station, the transceiver module is specifically configured to:
  report bits that are set by the processing module to the base station according to a sequence of sequence numbers corresponding to the bits.

With reference to the first aspect, in a fourth implementation, the apparatus further includes:
  a storage module, configured to store a sequence number that is predefined by the storage module and the base station and that is corresponding to each sub-combination of the carrier combination, where
  when reporting the information, determined by the processing module, about the sub-combination that is of the carrier combination and that is supported by the UE to the base station, the transceiver module is specifically configured to:
  report a sequence number corresponding to the sub-combination that is of the carrier combination and that is supported by the UE to the base station according to the sequence number stored in the storage module.

According to a second aspect, an embodiment of the present invention provides a carrier aggregation capability reporting apparatus, including:
  a processor, configured to determine information about a carrier combination supported by user equipment UE in which the apparatus is located and information about a sub-combination that is of the carrier combination and that is supported by the UE; and
  a transceiver, configured to report, to a base station, the information about the carrier combination supported by the UE and the information about the sub-combination that is of the carrier combination and that is supported by the UE, where the information about the carrier combination and the information about the sub-combination are determined by the processor.

With reference to the second aspect, in a first implementation, capability information of the sub-combination of the carrier combination is the same as capability information of the carrier combination, and the capability information includes a multiple-input multiple-output MIMO capability and/or a channel state information CSI capability.

With reference to the first implementation of the second aspect, in a second implementation of the second aspect,
  the processor is further configured to:
  determine, in sub-combinations of the carrier combination that are supported by the UE, a sub-combination that has different capability information from the capability information of the carrier combination, and determine information about the sub-combination and the capability information of the sub-combination; and
  the transceiver is further configured to:
  separately report the information about the sub-combination and the capability information of the sub-combination that are determined by the processor to the base station.

With reference to the second aspect, in a third implementation, the apparatus further includes:
a memory, configured to store a sequence number that is predefined by the memory and the base station and that is corresponding to each sub-combination of the carrier combination, where
the processor is further configured to:
according to the sequence number stored in the memory, separately set, to a first value, a bit of a sequence number corresponding to a sub-combination that is of the carrier combination and that is supported by the UE, and set, to a second value, a bit of a sequence number corresponding to a sub-combination that is of the carrier combination and that is not supported by the UE; and
when reporting the information, determined by the processor, about the sub-combination that is of the carrier combination and that is supported by the UE to the base station, the transceiver is specifically configured to:
report bits that are set by the processor to the base station according to a sequence of sequence numbers corresponding to the bits.

With reference to the second aspect, in a fourth implementation, the apparatus further includes:
a memory, configured to store a sequence number that is predefined by the memory and the base station and that is corresponding to each sub-combination of the carrier combination, where
when reporting the information, determined by the processor, about the sub-combination that is of the carrier combination and that is supported by the UE to the base station, the transceiver is specifically configured to:
report a sequence number corresponding to the sub-combination that is of the carrier combination and that is supported by the UE to the base station according to the sequence number stored in the memory.

According to a third aspect, an embodiment of the present invention provides a carrier aggregation capability reporting method, including:
determining, by user equipment UE, information about a carrier combination supported by the UE and information about a sub-combination that is of the carrier combination and that is supported by the UE; and
reporting, by the UE to a base station, the determined information about the carrier combination supported by the UE and the determined information about the sub-combination that is of the carrier combination and that is supported by the UE.

With reference to the third aspect, in a first implementation, capability information of the sub-combination of the carrier combination is the same as capability information of the carrier combination, and the capability information includes a multiple-input multiple-output MIMO capability and/or a channel state information CSI capability.

With reference to the first implementation of the third aspect, in a second implementation of the third aspect, the method further includes:
determining, by the UE in sub-combinations of the carrier combination that are supported by the UE, a sub-combination that has different capability information from the capability information of the carrier combination, and determining information about the sub-combination and the capability information of the sub-combination; and
separately reporting, by the UE, the information about the sub-combination and the capability information of the sub-combination to the base station.

With reference to the third aspect, in a third implementation, the reporting, by the UE, the determined information about the sub-combination that is of the carrier combination and that is supported by the UE to a base station includes:
according to a sequence number that is predefined by the UE and the base station and that is corresponding to each sub-combination of the carrier combination, separately setting, by the UE to a first value, a bit of a sequence number corresponding to a sub-combination that is of the carrier combination and that is supported by the UE, and setting, to a second value, a bit of a sequence number corresponding to a sub-combination that is of the carrier combination and that is not supported by the UE; and
reporting, by the UE, specified bits to the base station according to a sequence of sequence numbers corresponding to the bits.

With reference to the third aspect, in a fourth implementation, the reporting, by the UE, the determined information about the sub-combination that is of the carrier combination and that is supported by the UE to a base station includes:
reporting, by the UE, a sequence number corresponding to the sub-combination that is of the carrier combination and that is supported by the UE to the base station according to a sequence number that is predefined by the UE and the base station and that is corresponding to each sub-combination of the carrier combination.

In this embodiment, the UE reports, to the base station, the information about the carrier combination supported by the UE and the information about the sub-combination that is of the carrier combination and that is supported by the UE. The capability information corresponding to the carrier combination supported by the UE is the same as the capability information corresponding to the sub-combination that is of the carrier combination and that is supported by the UE, and the UE may directly report the information about the sub-combination that is of the carrier combination and that is supported by the UE to the base station, and does not need to follow an existing reporting mechanism in which the UE needs to perform reporting for each carrier combination supported by the UE, and indicate capability information corresponding to each carrier combination. Therefore, according to a technical solution provided in this embodiment, a problem in the existing reporting mechanism that the UE repeatedly reports capability information corresponding to a carrier combination can be avoided, and waste of signaling resources used for reporting can be reduced.

The embodiments of the present invention provide a carrier aggregation capability reporting method and apparatus, so that the UE reports capability information corresponding to each carrier in the carrier combination supported by the UE to the base station.

According to a fourth aspect, an embodiment of the present invention provides a carrier aggregation capability reporting apparatus, including:
a processing module, configured to determine capability information corresponding to each carrier in a carrier combination supported by user equipment UE in which the apparatus is located, where the capability information includes a multiple-input multiple-output MIMO capability and/or a channel state information CSI capability; and
a transceiver module, configured to report the capability information that is corresponding to each carrier and that is determined by the processing module to a base station.

With reference to the fourth aspect, in a first implementation, the apparatus further includes:
a storage module, configured to store a sequence number predefined by the storage module and the base station, where each predefined sequence number indicates a set including capability information corresponding to each carrier in the carrier combination, where
when reporting the capability information that is corresponding to each carrier and that is determined by the processing module to the base station, the transceiver module is specifically configured to:
report the capability information that is corresponding to each carrier and that is determined by the processing module to the base station according to the sequence number stored in the storage module.

With reference to the first implementation of the fourth aspect, in a second implementation of the fourth aspect, the sequence number that is predefined by the memory and
the base station and that is stored in the memory is included in a same list, and the list includes all sets including capability information corresponding to each carrier in the carrier combination; or the sequence number that is predefined by the memory and the base station and that is stored in the memory is included in lists whose quantity is the same as a frequency band quantity of the carrier combination, and each list includes all sets including capability information corresponding to each carrier on a same frequency band.

With reference to the first or second implementation of the fourth aspect, in a third implementation of the fourth aspect, the processing module is further configured to:
separately set, to a first value, a bit of a sequence number corresponding to a set including capability information that is corresponding to each carrier and that is supported by the UE, and set, to a second value, a bit of a sequence number corresponding to a set including capability information that is corresponding to each carrier and that is not supported by the UE; and
when reporting the capability information that is corresponding to each carrier and that is determined by the processing module to the base station according to the sequence number stored in the storage module, the transceiver module is specifically configured to:
report bits that are set by the processing module to the base station according to a sequence of sequence numbers corresponding to the bits.

With reference to the first or second implementation of the fourth aspect, in a fourth implementation of the fourth aspect, when reporting the capability information that is corresponding to each carrier and that is determined by the processing module to the base station according to the sequence number stored in the storage module, the transceiver module is specifically configured to:
report, to the base station, a sequence number corresponding to a set including capability information that is corresponding to each carrier and that is supported by the UE and determined by the processing module.

With reference to the fourth aspect, in a fifth implementation, the transceiver module is further configured to:
receive carrier range information sent by the base station, where the carrier range information is used for instructing the transceiver module to report the capability information corresponding to the carrier to the base station, and the carrier range information includes at least one type of the following information:
an aggregation carrier bandwidth range, an aggregation carrier type, or an aggregation carrier quantity range.

With reference to the fifth implementation of the fourth aspect, in a sixth implementation of the fourth aspect, before receiving the carrier range information sent by the base station, the transceiver module is further configured to:
report information about a maximum carrier aggregation capability supported by the UE to the base station, where the information about the maximum carrier aggregation capability is used by the base station to send the carrier range information to the transceiver module.

According to a fifth aspect, an embodiment of the present invention provides a carrier aggregation capability reporting apparatus, including:
a processor, configured to determine capability information corresponding to each carrier in a carrier combination supported by user equipment UE in which the apparatus is located, where the capability information includes a multiple-input multiple-output MIMO capability and/or a channel state information CSI capability; and
a transceiver, configured to report the capability information that is corresponding to each carrier and that is determined by the processor to a base station.

With reference to the fifth aspect, in a first implementation, the apparatus further includes:
a memory, configured to store a sequence number predefined by the memory and the base station, where each predefined sequence number indicates a set including capability information corresponding to each carrier in the carrier combination, where
when reporting the capability information that is corresponding to each carrier and that is determined by the processor to the base station, the transceiver is specifically configured to:
report the capability information that is corresponding to each carrier and that is determined by the processor to the base station according to the sequence number stored in the memory.

With reference to the first implementation of the fifth aspect, in a second implementation of the fifth aspect, the sequence number that is predefined by the memory and the base station and that is stored in the memory is included in a same list, and the list includes all sets including capability information corresponding to each carrier in the carrier combination; or
the sequence number that is predefined by the memory and the base station and that is stored in the memory is included in lists whose quantity is the same as a frequency band quantity of the carrier combination, and each list includes all sets including capability information corresponding to each carrier on a same frequency band.

With reference to the first or second implementation of the fifth aspect, in a third implementation of the fifth aspect, the processor is further configured to:
separately set, to a first value, a bit of a sequence number corresponding to a set including capability information that is corresponding to each carrier and that is supported by the UE, and set, to a second value, a bit of a sequence number corresponding to a set including capability information that is corresponding to each carrier and that is not supported by the UE; and
when reporting the capability information that is corresponding to each carrier and that is determined by the processor to the base station according to the sequence number stored in the memory, the transceiver is specifically configured to:

report bits that are set by the processor to the base station according to a sequence of sequence numbers corresponding to the bits.

With reference to the first or second implementation of the fifth aspect, in a fourth implementation of the fifth aspect, when reporting the capability information that is corresponding to each carrier and that is determined by the processor to the base station according to the sequence number stored in the memory, the transceiver is specifically configured to:

report, to the base station, a sequence number corresponding to a set including capability information that is corresponding to each carrier and that is supported by the UE and determined by the processor.

With reference to the fifth aspect, in a fifth implementation, the transceiver is further configured to:

receive carrier range information sent by the base station, where the carrier range information is used for instructing the transceiver to report the capability information corresponding to the carrier to the base station, and the carrier range information includes at least one type of the following information:

an aggregation carrier bandwidth range, an aggregation carrier type, or an aggregation carrier quantity range.

With reference to the fifth implementation of the fifth aspect, in a sixth implementation of the fifth aspect, before receiving the carrier range information sent by the base station, the transceiver is further configured to:

report information about a maximum carrier aggregation capability supported by the UE to the base station, where the information about the maximum carrier aggregation capability is used by the base station to send the carrier range information to the transceiver.

According to a sixth aspect, an embodiment of the present invention provides a carrier aggregation capability reporting method, including:

determining, by user equipment UE, capability information corresponding to each carrier in a carrier combination supported by the UE, where the capability information includes a multiple-input multiple-output MIMO capability and/or a channel state information CSI capability; and reporting, by the UE to a base station, the determined capability information corresponding to each carrier.

With reference to the sixth aspect, in a first implementation, the reporting, by the UE to a base station, the determined capability information corresponding to each carrier includes:

reporting, by the UE, the capability information corresponding to each carrier in the carrier combination supported by the UE to the base station according to a sequence number predefined by the UE and the base station, where each predefined sequence number indicates a set including capability information corresponding to each carrier in the carrier combination.

With reference to the first implementation of the sixth aspect, in a second implementation of the sixth aspect, the sequence number predefined by the UE and the base station is included in a same list, and the list includes all sets including capability information corresponding to each carrier in the carrier combination; or the sequence number predefined by the UE and the base station is included in lists whose quantity is the same as a frequency band quantity of the carrier combination, and each list includes all sets including capability information corresponding to each carrier on a same frequency band.

With reference to the first or second implementation of the sixth aspect, in a third implementation of the sixth aspect, the reporting, by the UE, the capability information corresponding to each carrier in the carrier combination supported by the UE to the base station according to a sequence number predefined by the UE and the base station includes:

separately setting, by the UE to a first value, a bit of a sequence number corresponding to a set including capability information that is corresponding to each carrier and that is supported by the UE, and setting, to a second value, a bit of a sequence number corresponding to a set including capability information that is corresponding to each carrier and that is not supported by the UE; and reporting, by the UE, specified bits to the base station according to a sequence of sequence numbers corresponding to the bits.

With reference to the first or second implementation of the sixth aspect, in a fourth implementation of the sixth aspect, the reporting, by the UE, the capability information corresponding to each carrier in the carrier combination supported by the UE to the base station according to a sequence number predefined by the UE and the base station includes:

reporting, by the UE to the base station, a sequence number corresponding to a set including capability information that is corresponding to each carrier and that is supported by the UE.

With reference to the sixth aspect, in a fifth implementation, the method further includes:

receiving, by the UE, carrier range information sent by the base station, where the carrier range information is used for instructing the UE to report the capability information corresponding to the carrier to the base station, and the carrier range information includes at least one type of the following information:

an aggregation carrier bandwidth range, an aggregation carrier type, or an aggregation carrier quantity range.

With reference to the fifth implementation of the sixth aspect, in a sixth implementation of the sixth aspect, before the receiving, by the UE, carrier range information sent by the base station, the method further includes:

reporting, by the UE, information about a maximum carrier aggregation capability supported by the UE to the base station, where the information about the maximum carrier aggregation capability is used by the base station to send the carrier range information to the UE.

In this embodiment, the UE reports the determined capability information corresponding to each carrier in the carrier combination to the base station, so that the base station can thoroughly learn the capability information corresponding to each carrier in the carrier combination supported by the UE. By means of predefining performed by the UE and the base station, content of capability information that is corresponding to a carrier and that is reported by the UE to the base station is simplified, so that reporting signaling overheads are reduced. The UE reports, according to the carrier range information sent by the base station, the capability information corresponding to the carrier to the base station, and the UE does not need to report capability information corresponding to all carriers supported by the UE to the base station, so that reporting signaling waste is avoided.

The embodiments of the present invention provide a carrier measurement method and apparatus, so that UE parallelly measures all inter-frequencies in a carrier combination supported by the UE, and a quantity of inter-frequencies that are in the carrier combination supported by the UE and that are parallelly measured by the UE is increased.

According to a seventh aspect, an embodiment of the present invention provides a carrier measurement apparatus, including:
- a transceiver module, configured to: report indication information to a base station, where the indication information is used to indicate that user equipment UE in which the apparatus is located supports parallel measurement performed in a measurement gap on inter-frequencies of a carrier in carrier aggregation supported by the UE; and receive measurement configuration information that is sent by the base station according to the indication information and that includes the inter-frequencies of the carrier in the carrier aggregation supported by the UE; and
- a processing module, configured to parallelly measure, in the measurement gap according to the measurement configuration information received by the transceiver module, the inter-frequencies of the carrier in the carrier aggregation supported by the UE.

With reference to the seventh aspect, in a first implementation, when receiving the measurement configuration information that is sent by the base station according to the indication information and that includes the inter-frequencies of the carrier within the carrier aggregation range supported by the UE, the transceiver module is specifically configured to:
- receive a radio resource control RRC reconfiguration message sent by the base station, where the RRC reconfiguration message carries the measurement configuration information that is sent by the base station according to the indication information and that is of the inter-frequencies of the carrier in the carrier aggregation supported by the UE.

According to an eighth aspect, an embodiment of the present invention provides a carrier measurement apparatus, including:
- a transceiver, configured to: report indication information to a base station, where the indication information is used to indicate that user equipment UE in which the apparatus is located supports parallel measurement performed in a measurement gap on inter-frequencies of a carrier in carrier aggregation supported by the UE; and receive measurement configuration information that is sent by the base station according to the indication information and that includes the inter-frequencies of the carrier in the carrier aggregation supported by the UE; and
- a processor, configured to parallelly measure, in the measurement gap according to the measurement configuration information received by the transceiver, the inter-frequencies of the carrier in the carrier aggregation supported by the UE.

With reference to the eighth aspect, in a first implementation, when receiving the measurement configuration information that is sent by the base station according to the indication information and that includes the inter-frequencies of the carrier within the carrier aggregation range supported by the UE, the transceiver is specifically configured to:
- receive a radio resource control RRC reconfiguration message sent by the base station, where the RRC reconfiguration message carries the measurement configuration information that is sent by the base station according to the indication information and that is of the inter-frequencies of the carrier in the carrier aggregation supported by the UE.

According to a ninth aspect, an embodiment of the present invention provides a carrier measurement method, including:
- reporting, by user equipment UE to a base station, indication information used to indicate that the UE supports parallel measurement performed in a measurement gap on inter-frequencies of a carrier in carrier aggregation supported by the UE;
- receiving, by the UE, measurement configuration information that is sent by the base station according to the indication information and that includes the inter-frequencies of the carrier in the carrier aggregation supported by the UE; and
- parallelly measuring, by the UE in the measurement gap according to the received measurement configuration information, the inter-frequencies of the carrier in the carrier aggregation supported by the UE.

With reference to the ninth aspect, in a first implementation, the receiving, by the UE, measurement configuration information that is sent by the base station according to the indication information and that includes the inter-frequencies of the carrier within the carrier aggregation range supported by the UE includes:
- receiving, by the UE, a radio resource control RRC reconfiguration message sent by the base station, where the RRC reconfiguration message carries the measurement configuration information that is sent by the base station according to the indication information and that is of the inter-frequencies of the carrier in the carrier aggregation supported by the UE.

According to a tenth aspect, an embodiment of the present invention provides a carrier measurement apparatus, including:
- a transceiver module, configured to receive indication information reported by user equipment UE, where the indication information is used to indicate that the UE supports parallel measurement performed in a measurement gap on inter-frequencies of a carrier in carrier aggregation supported by the UE; and
- a processing module, configured to determine, according to the indication information received by the transceiver module, measurement configuration information of the inter-frequencies of the carrier in the carrier aggregation supported by the UE, where
- the transceiver module is further configured to send the measurement configuration information determined by the processing module to the UE.

With reference to the tenth aspect, in a first implementation, when sending the measurement configuration information determined by the processing module to the UE, the transceiver module is specifically configured to:
- send a radio resource control RRC reconfiguration message to the UE, where the RRC reconfiguration message carries the measurement configuration information.

According to an eleventh aspect, an embodiment of the present invention provides a carrier measurement apparatus, including:
- a transceiver, configured to receive indication information reported by user equipment UE, where the indication information is used to indicate that the UE supports parallel measurement performed in a measurement gap on inter-frequencies of a carrier in carrier aggregation supported by the UE; and
- a processor, configured to determine, according to the indication information received by the transceiver, measurement configuration information of the inter-frequencies of the carrier in the carrier aggregation supported by the UE, where the transceiver is further configured to send the measurement configuration information determined by the processor to the UE.

With reference to the eleventh aspect, in a first implementation, when sending the measurement configuration information determined by the processor to the UE, the transceiver is specifically configured to:

send a radio resource control RRC reconfiguration message to the UE, where the RRC reconfiguration message carries the measurement configuration information.

According to a twelfth aspect, an embodiment of the present invention provides a carrier measurement method, including:

receiving, by a base station, indication information reported by user equipment UE for indicating that the UE supports parallel measurement performed in a measurement gap on inter-frequencies of a carrier in carrier aggregation supported by the UE;

determining, by the base station according to the indication information, measurement configuration information of the inter-frequencies of the carrier in the carrier aggregation supported by the UE; and sending, by the base station, the measurement configuration information to the UE.

With reference to the twelfth aspect, in a first implementation, the sending, by the base station, the measurement configuration information to the UE includes:

sending, by the base station, a radio resource control RRC reconfiguration message to the UE, where the RRC reconfiguration message carries the measurement configuration information.

In this embodiment, the UE sends, to the base station, the indication information used to indicate that the UE supports the parallel measurement performed on the inter-frequencies of the carrier in the carrier aggregation. The base station determines the measurement configuration information of the inter-frequencies of the carrier in the carrier aggregation of the UE according to the indication information, and then the base station sends the measurement configuration information to the UE. The UE parallelly measures the inter-frequencies of the carrier in the carrier aggregation in the measurement gap according to the measurement configuration information. The measurement configuration information includes information about the inter-frequencies of the carrier in the carrier aggregation. Therefore, the UE can parallelly measure all inter-frequencies in the carrier aggregation supported by the UE, so as to prevent the UE from parallelly measuring, in an existing measurement mechanism, only three inter-frequencies in the carrier aggregation supported by the UE. According to a technical method in this embodiment, a quantity of inter-frequencies that are in the carrier aggregation supported by the UE and that are parallelly measured by the UE can be increased.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The technical solutions in the present invention may be applied to various communications systems such as a Global System for Mobile Communications (GSM for short), a Code Division Multiple Access (CDMA for short) system, a Wideband Code Division Multiple Access (WCDMA for short) system, a general packet radio service (GPRS for short) system, a Long Term Evolution (LTE for short) system, and a Universal Mobile Telecommunications System (UMTS for short). This is not limited in the present invention.

In the embodiments of the present invention, user equipment (UE for short) may also be referred to as a mobile terminal, mobile user equipment, and the like, and may communicate with one or more core network devices via a radio access network (RAN for short). The UE may be a mobile terminal, such as a mobile phone (also referred to as a "cellular" phone) and a computer with a mobile terminal. For example, the UE may be a portable, pocket-sized, handheld, computer built-in, or in-vehicle mobile apparatus that exchanges a voice and/or data with the radio access network. This is not limited in the present invention.

A base station has a function of receiving and sending data. A corresponding sending device and receiving device may be UE, a base station controller, a core network device, and a master eNodeB. This is not limited in the present invention. The base station may be a base transceiver station (BTS for short) in a GSM or CDMA, or may be a NodeB (NodeB) in WCDMA, or may be an evolved NodeB (eNB for short) in LTE. This is not limited in the present invention. The base station includes control nodes of various access network nodes, for example, a radio network controller (RNC for short) in a UMTS, or a controller that manages multiple small cells.

Figure 1:
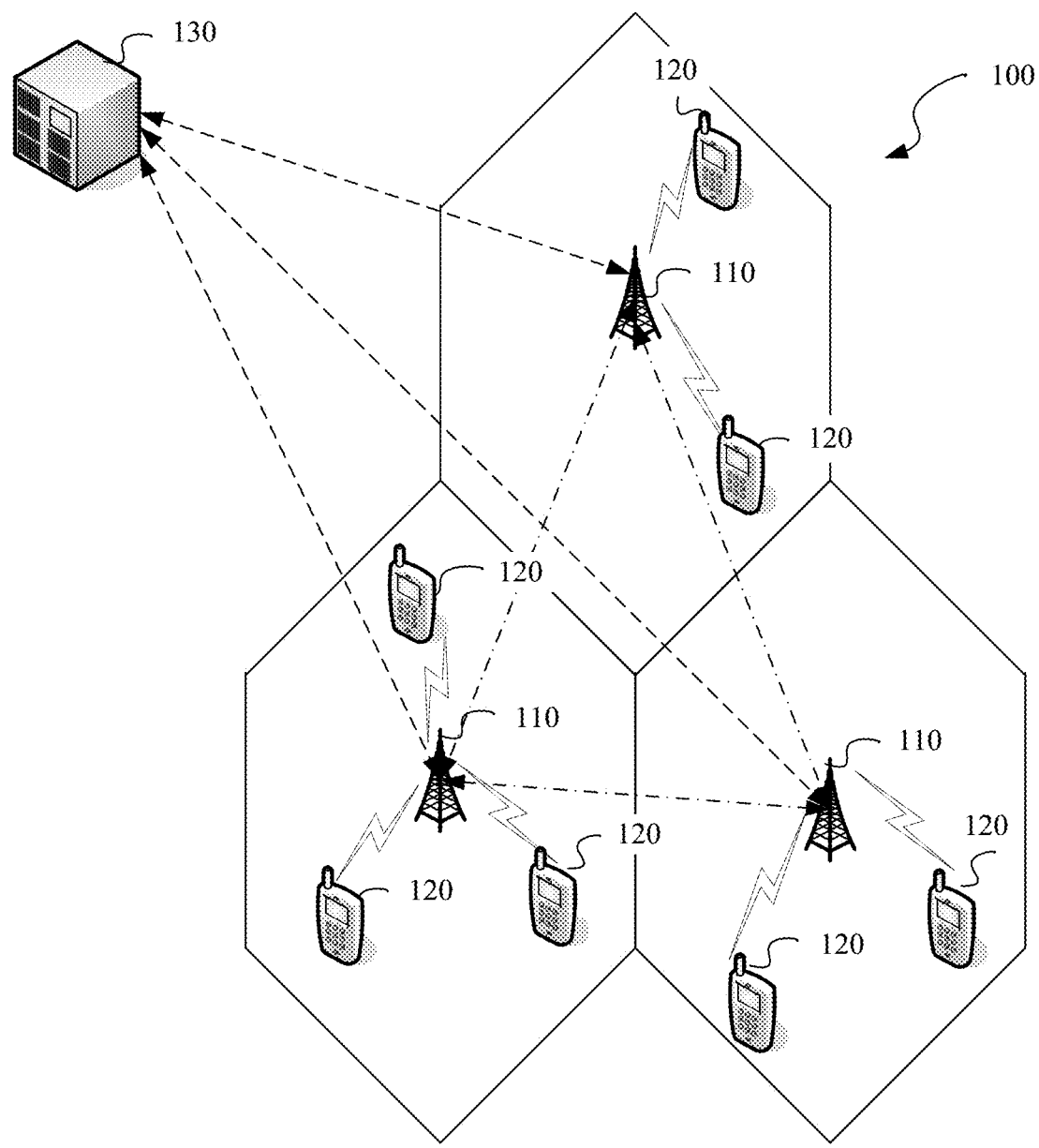
FIG. 1 is a schematic architecture diagram of an LTE communications system according to an embodiment of the present invention.

In the embodiments of the present invention, an LTE communications system is used as an example, but this is not limited herein. As shown in FIG. 1, in a schematic architecture diagram of the LTE communications system, a wireless communications network 100 may include at least one base station 110 and a core network device 130, to support communication of UE 120. For example, the base station 110 may be an eNB in LTE, and the base station 110 may support or manage one or more cells. The core network device 130 may include a mobility management entity (MME for short).

Figure 2A:
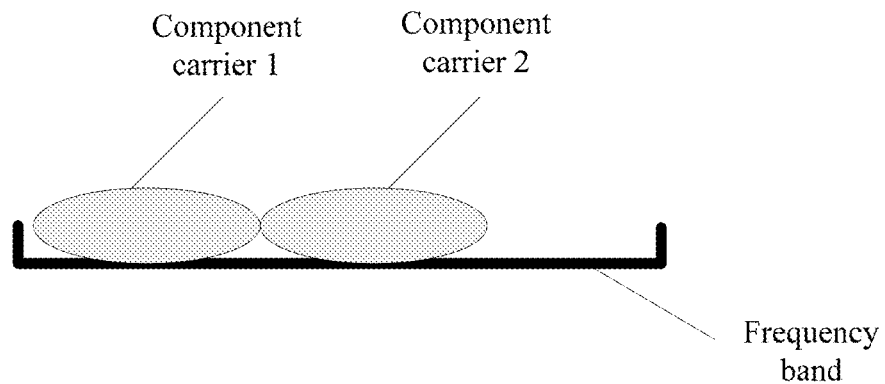
FIG. 2(a) is a schematic diagram of aggregation of two contiguous carriers on a same frequency band according to an embodiment of the present invention.
Figure 2B:
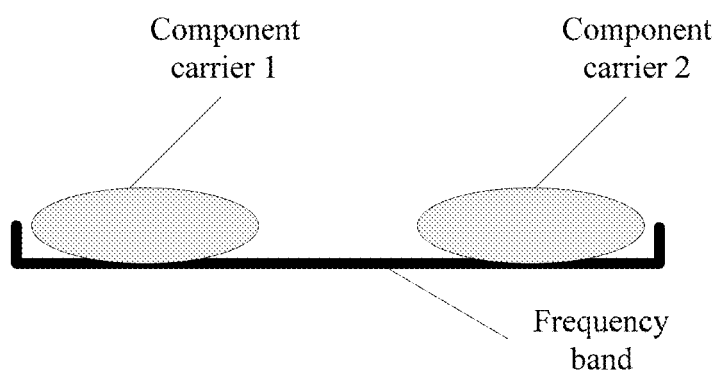
FIG. 2(b) is a schematic diagram of aggregation of two non-contiguous carriers on a same frequency band according to an embodiment of the present invention.
Figure 2C:
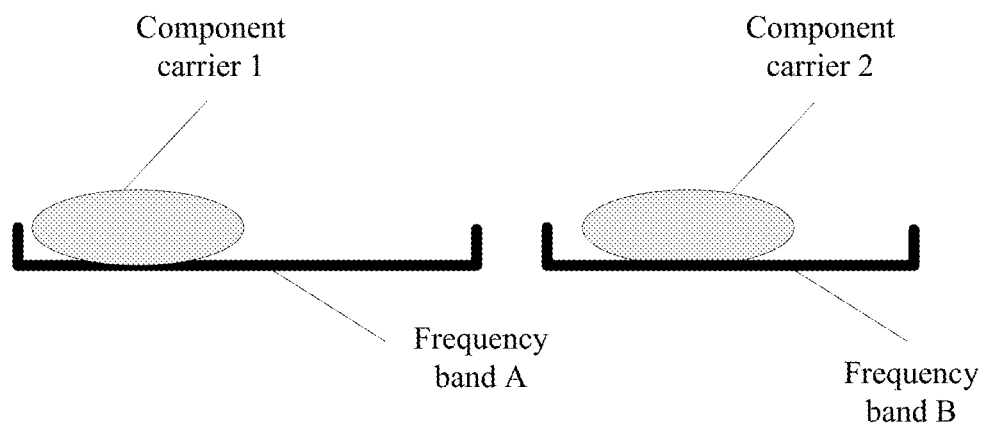
FIG. 2(c) is a schematic diagram of aggregation of two component carriers on different frequency bands according to an embodiment of the present invention.

The technical solutions in the present invention relate a carrier aggregation technology. Carrier aggregation means that two or more component carriers (CC for short) are aggregated to support higher transmission bandwidth. Maximum transmission bandwidth of each component carrier is 20 MHz, and the maximum transmission bandwidth may reach 100 MHz by using the carrier aggregation technology. As shown in FIG. 2(a), FIG. 2(b), and FIG. 2(c), the carrier aggregation technology supports aggregation of different types of component carriers. FIG. 2(a) shows aggregation of two contiguous component carriers on a same frequency band: a component carrier 1 and a component carrier 2. FIG. 2(b) shows aggregation of two non-contiguous carriers on a same frequency band: a component carrier 1 and a component carrier 2. FIG. 2(c) shows aggregation of two component carriers on different frequency bands: a component carrier 1 and a component carrier 2, and a frequency band on which the component carrier 1 is located is a frequency band A, and a frequency band on which the component carrier 2 is located is a frequency band B.

Embodiment 1

Figure 3:
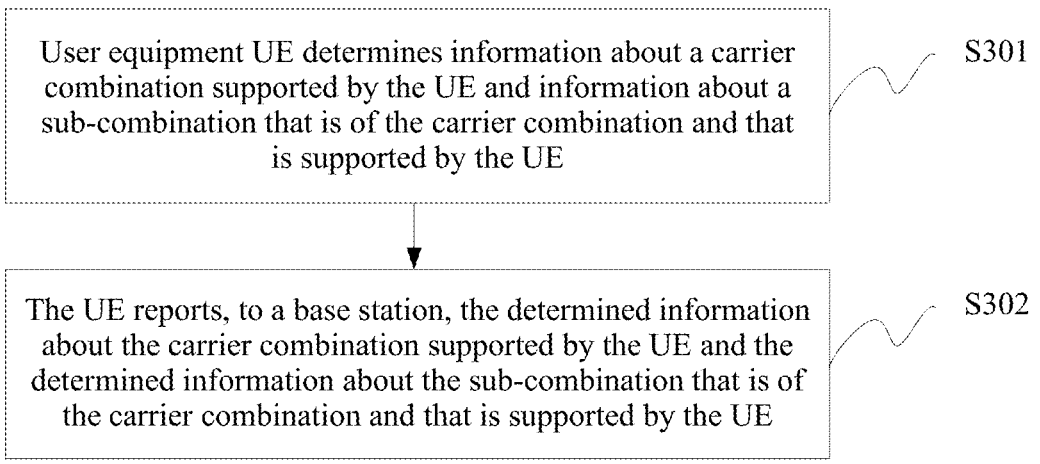
FIG. 3 is a schematic flowchart of a carrier aggregation capability reporting method according to an embodiment of the present invention.

As shown in FIG. 3, this embodiment of the present invention provides a carrier aggregation capability reporting method, and the method includes the following steps:

S301. User equipment UE determines information about a carrier combination supported by the UE and information about a sub-combination that is of the carrier combination and that is supported by the UE.

S302. The UE reports, to a base station, the determined information about the carrier combination supported by the UE and the determined information about the sub-combination that is of the carrier combination and that is supported by the UE.

In this embodiment, the information that is determined by the UE and that is about the carrier combination supported by the UE may include information such as a carrier aggregation band class on each frequency band of the carrier combination, a MIMO capability corresponding to the carrier aggregation band class on each frequency band, and a CSI capability corresponding to the carrier aggregation band class on each frequency band. The carrier aggregation band class includes a downlink carrier aggregation band class and an uplink carrier aggregation band class. The carrier aggregation band class further includes a carrier quantity and total carrier bandwidth.

For example, the UE supports a carrier combination BAND_A (DL Class B, UL Class A)+BAND_B (DL Class B). BAND_A (DL Class B, UL Class A)+BAND_B (DL Class B) indicates aggregation of a frequency band A and a frequency band B. The frequency band A includes downlink carrier aggregation of a band class B and uplink carrier aggregation of a band class A. The frequency band B includes downlink carrier aggregation of a band class B. Total bandwidth and carrier quantities corresponding to different carrier aggregation band classes are shown in Table 1.

TABLE 1

| Carrier aggregation band class | Total bandwidth | Carrier quantity |
|---|---|---|
| A | $N_{RB,agg} \leq 100$ | 1 |
| B | $25 < N_{RB,agg} \leq 100$ | 2 |
| C | $100 < N_{RB,agg} \leq 200$ | 2 |
| D | $200 < N_{RB,agg} \leq 300$ | 3 |
| E | $300 < N_{RB,agg} \leq 400$ | 4 |
| F | $400 < N_{RB,agg} \leq 500$ | 5 |

In this embodiment, the sub-combination of the carrier combination is a carrier combination that includes different carrier aggregation band classes on each frequency band of the carrier combination. A carrier combination BAND_A (DL Class B, UL Class A)+BAND_B (DL Class B, UL Class A) is used as an example. A sub-combination of the carrier combination BAND_A (DL Class B, UL Class A)+BAND_B (DL Class B, UL Class A) is shown in Table 2. BAND_A (DL Class B, UL Class A)+BAND_B (DL Class B, UL Class A) is an original carrier combination in Table 2.

TABLE 2

| Sequence number corresponding to a sub-combination | BAND A | BAND B | Description |
|---|---|---|---|
| 1 | DL Class B, UL Class A | DL Class B | One uplink carrier fewer than BAND_B in the original carrier combination |
| 2 | DL Class B | DL Class B, UL Class A | One uplink carrier fewer than BAND_A in the original carrier combination |
| 3 | DL Class B, UL Class A | — | With no carrier on BAND_B in the original carrier combination |
| 4 | — | DL Class B, UL Class A | With no carrier on BAND_A in the original carrier combination |
| 5 | DL Class B, UL Class A | UL Class A | One downlink carrier fewer than BAND_B in the original carrier combination |
| 6 | UL Class A | DL Class B, UL Class A | One downlink carrier fewer than BAND_A in the original carrier combination |
| 7 | UL Class A | UL Class A | One downlink carrier fewer than BAND_B in the original carrier combination and one downlink carrier fewer than BAND_A in the original carrier combination |
| 8 | — | UL Class A | One downlink carrier fewer than BAND_B in the original carrier combination and with no carrier on BAND_A in the original carrier combination |
| 9 | UL Class A | — | With no carrier on BAND_B in the original carrier combination and one downlink carrier fewer than BAND_A in the original carrier combination |

In this embodiment, if the UE supports a sub-combination of the carrier combination, and capability information corresponding to the sub-combination that is of the carrier combination and that is supported by the UE is the same as capability information corresponding to the carrier combination supported by the UE, the UE may directly report information about the sub-combination that is of the carrier combination and that is supported by the UE to the base station. If the UE supports a sub-combination of the carrier combination, but capability information corresponding to the sub-combination that is of the carrier combination and that is supported by the UE is different from capability information corresponding to the carrier combination supported by the UE, the UE may separately report information about the sub-combination that is of the carrier combination and that is supported by the UE to the base station, and report the capability information corresponding to the sub-combination that is of the carrier combination and that is supported by the UE to the base station.

Optionally, the UE may report the information about the sub-combination that is of the carrier combination and that is supported by the UE to the base station by using the following two implementations.

In a first implementation, the UE and the base station predefine a sequence number (for example, Table 2) corresponding to each sub-combination of the carrier combination, and the UE and the base station predefine that when a bit of a sequence number corresponding to a sub-combination is set to a first value, it indicates that the UE supports the sub-combination, and capability information corresponding to the sub-combination is the same as the capability information corresponding to the original carrier combination of the sub-combination; and when a bit of a sequence number corresponding to a sub-combination is set to a second value, it indicates that the UE does not support the sub-combination.

For any sub-combination of the carrier combination supported by the UE, when the UE determines that the UE supports the sub-combination, and capability information corresponding to the sub-combination is the same as the capability information corresponding to the original carrier combination of the sub-combination, a bit of a sequence number corresponding to the sub-combination is set to the first value; and when the UE determines that the UE does not support the sub-combination, a bit of a sequence number corresponding to the sub-combination is set to the second value. Then the UE reports specified bits to the base station according to a sequence of sequence numbers corresponding to the bits. If the UE supports a sub-combination of the carrier combination, but capability information corresponding to the sub-combination that is of the carrier combination and that is supported by the UE is different from the capability information corresponding to the carrier combination supported by the UE, the UE may separately report information about the sub-combination that is of the carrier combination and that is supported by the UE to the base station, and report the capability information corresponding to the sub-combination that is of the carrier combination and that is supported by the UE to the base station.

With reference to Table 2, for example, the first value is 1 and the second value is 0. When the specified bits reported by the UE to the base station are 111100011, the base station may learn from Table 2 predefined by the base station and the UE that the UE supports sub-combinations separately corresponding to sequence numbers 1, 2, 3, 4, 8, and 9 in Table 2, capability information separately corresponding to the sub-combinations is the same as capability information corresponding to the original carrier combination BAND_A (DL Class B, UL Class A)+BAND_B (DL Class B, UL Class A), and the UE does not support sub-combinations separately corresponding to sequence numbers 5, 6, and 7 in Table 2. In this way, the UE can report the information about the sub-combination that is of the carrier combination and that is supported by the UE to the base station. Therefore, a prior-art problem that the UE repeatedly reports a carrier combination supported by the UE and a sub-combination of the carrier combination is avoided, and reporting signaling overheads are reduced.

In a second implementation, the UE and the base station predefine a sequence number (for example, Table 2) corresponding to each sub-combination of the carrier combination. The UE reports a sequence number corresponding to a sub-combination that is of the carrier combination and that is supported by the UE to the base station. For example, after determining that the UE supports sub-combinations separately corresponding to sequence numbers 1, 2, 3, 4, 8, and 9 in Table 2, the UE reports 123489 to the base station. After receiving this message, the base station may learn from Table 2 predefined by the base station and the UE that the UE supports the sub-combinations separately corresponding to the sequence numbers 1, 2, 3, 4, 8, and 9 in Table 2.

It should be noted that, in this embodiment, the sequence number that is predefined by the UE and the base station and that is corresponding to a sub-combination of the carrier combination is not limited to a form in Table 2, and may be in another form. The first value and the second value predefined by the UE and the base station are not limited to values provided in this embodiment, and may be other values.

In this embodiment, optionally, after the UE reports the determined information about the carrier combination supported by the UE to the base station, the UE and the base station may consider by default that the UE supports all sub-combinations of the carrier combination, and capability information corresponding to each of the all sub-combinations is the same as the capability information corresponding to the carrier combination. When the UE determines that capability information corresponding to a sub-combination supported by the UE is different from the capability information corresponding to the carrier combination, the UE may separately report information about the sub-combination supported by the UE to the base station, and report the capability information corresponding to the sub-combination to the base station. Optionally, the UE may receive indication information sent by the base station, and the indication information is used to indicate that the UE and the base station consider by default that the UE supports all sub-combinations of the carrier combination supported by the UE. After the UE reports the information about the carrier combination supported by the UE to the base station, the UE and the base station may consider, by default based on the received indication information, that the UE supports all the sub-combinations of the carrier combination supported by the UE.

It should be noted that a manner of reporting, by the UE, the information about the sub-combination that is of the carrier combination and that is supported by the UE to the base station is not limited to the manner provided in this embodiment, and may be in another form.

Figure 4:
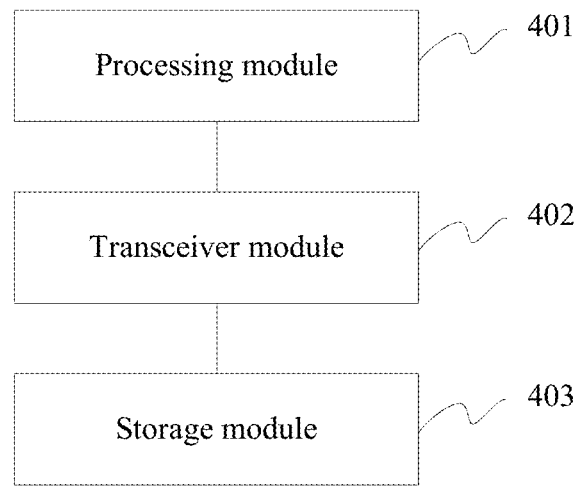
FIG. 4 is a schematic structural diagram of a carrier aggregation capability reporting apparatus according to an embodiment of the present invention.

As shown in FIG. 4, this embodiment of the present invention provides a carrier aggregation capability reporting apparatus, and the apparatus includes:

a processing module 401, configured to determine information about a carrier combination supported by user equipment UE in which the apparatus is located and information about a sub-combination that is of the carrier combination and that is supported by the UE; and a transceiver module 402, configured to report, to a base station, the information about the carrier combination supported by the UE and the information about the sub-combination that is of the carrier combination and that is supported by the UE, where the information about the carrier combination and the information about the sub-combination are determined by the processing module 401.

Optionally, capability information of the sub-combination of the carrier combination is the same as capability information of the carrier combination, and the capability information includes a multiple-input multiple-output MIMO capability and/or a channel state information CSI capability.

Optionally, the processing module 401 is further configured to:
determine, in sub-combinations of the carrier combination that are supported by the UE, a sub-combination that has different capability information from the capability information of the carrier combination, and determine information about the sub-combination and the capability information of the sub-combination.

The transceiver module 402 is further configured to:
separately report the information about the sub-combination and the capability information of the sub-combination that are determined by the processing module 401 to the base station.

Optionally, the apparatus further includes:
a storage module 403, configured to store a sequence number that is predefined by the storage module 403 and the base station and that is corresponding to each sub-combination of the carrier combination.

The processing module 401 is further configured to:
according to the sequence number stored in the storage module 403, separately set, to a first value, a bit of a sequence number corresponding to a sub-combination that is of the carrier combination and that is supported by the UE, and set, to a second value, a bit of a sequence number corresponding to a sub-combination that is of the carrier combination and that is not supported by the UE.

When reporting the information, determined by the processing module 401, about the sub-combination that is of the carrier combination and that is supported by the UE to the base station, the transceiver module 402 is specifically configured to:
report bits that are set by the processing module 401 to the base station according to a sequence of sequence numbers corresponding to the bits.

Optionally, the apparatus further includes:
a storage module 403, configured to store a sequence number that is predefined by the storage module 403 and the base station and that is corresponding to each sub-combination of the carrier combination.

When reporting the information, determined by the processing module 401, about the sub-combination that is of the carrier combination and that is supported by the UE to the base station, the transceiver module 402 is specifically configured to:
report a sequence number corresponding to the sub-combination that is of the carrier combination and that is supported by the UE to the base station according to the sequence number stored in the storage module 403.

Figure 5:
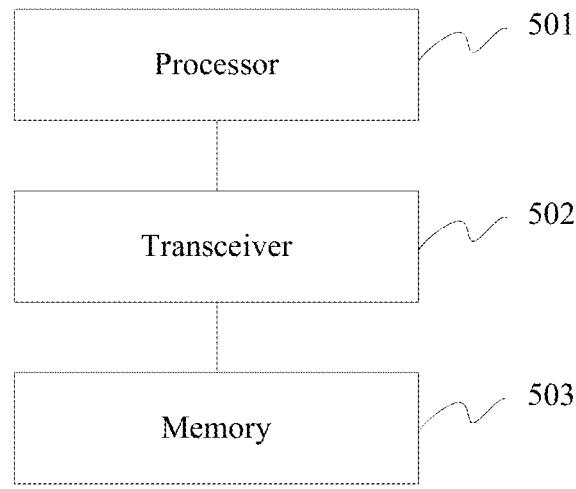
FIG. 5 is a schematic structural diagram of a carrier aggregation capability reporting apparatus according to an embodiment of the present invention.

As shown in FIG. 5, this embodiment of the present invention provides a carrier aggregation capability reporting apparatus, and the apparatus includes:

a processor 501, configured to determine information about a carrier combination supported by user equipment UE in which the apparatus is located and information about a sub-combination that is of the carrier combination and that is supported by the UE; and a transceiver 502, configured to report, to a base station, the information about the carrier combination supported by the UE and the information about the sub-combination that is of the carrier combination and that is supported by the UE, where the information about the carrier combination and the information about the sub-combination are determined by the processor 501.

Optionally, capability information of the sub-combination of the carrier combination is the same as capability information of the carrier combination, and the capability information includes a multiple-input multiple-output MIMO capability and/or a channel state information CSI capability.

Optionally, the processor 501 is further configured to:

determine, in sub-combinations of the carrier combination that are supported by the UE, a sub-combination that has different capability information from the capability information of the carrier combination, and determine information about the sub-combination and the capability information of the sub-combination.

The transceiver 502 is further configured to:

separately report the information about the sub-combination and the capability information of the sub-combination that are determined by the processor 501 to the base station.

Optionally, the apparatus further includes:

a memory 503, configured to store a sequence number that is predefined by the memory 503 and the base station and that is corresponding to each sub-combination of the carrier combination.

The processor 501 is further configured to:

according to the sequence number stored in the memory 503, separately set, to a first value, a bit of a sequence number corresponding to a sub-combination that is of the carrier combination and that is supported by the UE, and set, to a second value, a bit of a sequence number corresponding to a sub-combination that is of the carrier combination and that is not supported by the UE.

When reporting the information, determined by the processor 501, about the sub-combination that is of the carrier combination and that is supported by the UE to the base station, the transceiver 502 is specifically configured to:

report bits that are set by the processor 501 to the base station according to a sequence of sequence numbers corresponding to the bits.

Optionally, the apparatus further includes:

a memory 503, configured to store a sequence number that is predefined by the memory 503 and the base station and that is corresponding to each sub-combination of the carrier combination.

When reporting the information, determined by the processor 501, about the sub-combination that is of the carrier combination and that is supported by the UE to the base station, the transceiver 502 is specifically configured to:

report a sequence number corresponding to the sub-combination that is of the carrier combination and that is supported by the UE to the base station according to the sequence number stored in the memory 503.

In this embodiment, the UE reports, to the base station, the information about the carrier combination supported by the UE and the information about the sub-combination that is of the carrier combination and that is supported by the UE. The capability information corresponding to the carrier combination supported by the UE is the same as the capability information corresponding to the sub-combination that is of the carrier combination and that is supported by the UE, and the UE may directly report the information about the sub-combination that is of the carrier combination and that is supported by the UE to the base station, and does not need to follow an existing reporting mechanism in which the UE needs to perform reporting for each carrier combination supported by the UE, and indicate capability information corresponding to each carrier combination. Therefore, according to a technical solution provided in this embodiment, a problem in the existing reporting mechanism that the UE repeatedly reports capability information corresponding to a carrier combination can be avoided, and waste of signaling resources used for reporting can be reduced.

Embodiment 2

Figure 6:
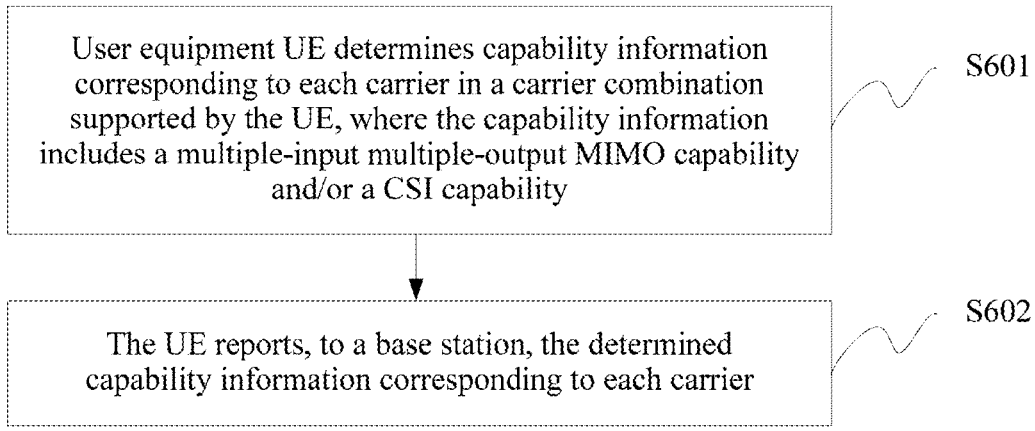
FIG. 6 is a schematic flowchart of a carrier aggregation capability reporting method according to an embodiment of the present invention.

As shown in FIG. 6, this embodiment of the present invention provides a carrier aggregation capability reporting method, and the method includes the following steps:

S601. User equipment UE determines capability information corresponding to each carrier in a carrier combination supported by the UE, where the capability information includes a multiple-input multiple-output MIMO capability and/or a CSI capability.

S602. The UE reports, to a base station, the determined capability information corresponding to each carrier.

In this embodiment, the capability information corresponding to each carrier may include the MIMO capability and/or the CSI capability, but is not limited thereto.

In this embodiment, the UE and the base station predefine a sequence number. Each predefined sequence number indicates a set including capability information corresponding to each carrier in the carrier combination supported by the UE. The UE reports the capability information corresponding to each carrier in the carrier combination supported by the UE to the base station according to the predefined sequence number.

There may be the following two implementations for the sequence number predefined by the UE and the base station.

In a first implementation, the sequence number predefined by the UE and the base station is included in a same list, and the list includes all sets including capability information corresponding to each carrier in the carrier combination. That is, the carrier combination supported by the UE is used as a whole, and a list is configured for the carrier combination. The list includes all sets including capability information corresponding to each carrier in the carrier combination. Each set is corresponding to a sequence number. For example, the UE supports a carrier combination A, the carrier combination A includes a frequency band 1 and a frequency band 2, the frequency band 1 and the frequency band 2 include N carriers in total, and capability information corresponding to each carrier in the carrier combination A forms M sets. In this case, a sequence number list predefined by the UE and the base station for the carrier combination A is shown in Table 3.

TABLE 3

| Sequence number | Carrier 1 | Carrier 2 | ... | Carrier N |
|---|---|---|---|---|
| 1 | Support two-layer MIMO Support a CSI 1 process | Support two-layer MIMO Support a CSI 1 process | ... | Support two-layer MIMO Support a CSI 1 process |
| 2 | Support four-layer MIMO Support a CSI 1 process | Support four-layer MIMO Support a CSI 1 process | ... | Support four-layer MIMO Support a CSI 1 process |
| ... | ... | ... | ... | ... |
| M | Support eight-layer MIMO Support a CSI 1 process | Support eight-layer MIMO Support a CSI 1 process | ... | Support eight-layer MIMO Support a CSI 1 process |

In Table 3, capability information corresponding to each carrier includes a MIMO capability and a CSI capability. In this embodiment, the UE and the base station may further predefine a sequence number for a type of capability information. For example, the UE performs predefining for a MIMO capability corresponding to a carrier. A list in which a sequence number predefined by the UE and the base station is located is shown in Table 4.

TABLE 4

| Sequence number | Carrier 1 | Carrier 2 | ... | Carrier N |
|---|---|---|---|---|
| 1 | Support two-layer MIMO | Support two-layer MIMO | ... | Support two-layer MIMO |
| 2 | Support four-layer MIMO | Support four-layer MIMO | ... | Support four-layer MIMO |
| ... | ... | ... | ... | ... |
| M | Support eight-layer MIMO | Support eight-layer MIMO | ... | Support eight-layer MIMO |

Likewise, capability information corresponding to the carrier may further include a network-assisted interference cancellation and suppression (NAICS for short) capability. Content and a type quantity of capability information corresponding to a carrier in the predefined list are not limited in this embodiment. In the first implementation, the list predefined by the UE and the base station may include in detail all sets including capability information corresponding to each carrier in the carrier combination, or may include only some pieces of typical configuration information, so as to reduce a length of the table.

In a second implementation, the sequence number predefined by the UE and the base station is included in lists whose quantity is the same as a frequency band quantity of the carrier combination, and each list includes all sets including capability information corresponding to each carrier in a carrier band class of a same frequency band. That is, a carrier band class of each frequency band of the carrier combination supported by the UE is used as a whole. The carrier band class of each frequency band is corresponding to a list. The list includes all sets including capability information corresponding to each carrier of the carrier band class of the frequency band, and each set is corresponding to a sequence number. For example, the UE supports a carrier combination A, capability information includes a MIMO capability and a CSI capability, and the carrier combination A includes a frequency band 1 and a frequency band 2. A carrier band class of the frequency band 1 is B. It may be learned from Table 1 that the frequency band 1 has two carriers, and capability information corresponding to each carrier on the frequency band 1 forms six sets in total. A carrier band class of the frequency band 2 is E. It may be learned from Table 1 that the frequency band 2 has four carriers, and capability information corresponding to each carrier on the frequency band 2 forms eight sets in total. In this case, sequence number lists predefined by the UE and the base station for the frequency band 1 and the frequency band 2 are shown in Table 5 and Table 6, respectively.

TABLE 5

| (carrier band class B) | | |
|---|---|---|
| Sequence number | Carrier 1 | Carrier 2 |
| 1 | Support two-layer MIMO Support a CSI 1 process | Support two-layer MIMO Support a CSI 3 process |
| 2 | Support two-layer MIMO Support a CSI 1 process | Support four-layer MIMO Support a CSI 3 process |
| 3 | Support four-layer MIMO Support a CSI 1 process | Support four-layer MIMO Support a CSI 3 process |
| 4 | Support four-layer MIMO Support a CSI 1 process | Support eight-layer MIMO Support a CSI 2 process |
| 5 | Support eight-layer MIMO Support a CSI 1 process | Support four-layer MIMO Support a CSI 2 process |
| 6 | Support eight-layer MIMO Support a CSI 1 process | Support eight-layer MIMO Support a CSI 1 process |

TABLE 6

| (carrier band class E) | | | | |
|---|---|---|---|---|
| Sequence number | Carrier 1 | Carrier 2 | Carrier 3 | Carrier 4 |
| 1 | Support two-layer MIMO Support a CSI 1 process | Support two-layer MIMO Support a CSI 1 process | Support two-layer MIMO Support a CSI 1 process | Support two-layer MIMO Support a CSI 2 process |
| 2 | Support two-layer MIMO Support a CSI 1 process | Support two-layer MIMO Support a CSI 1 process | Support four-layer MIMO Support a CSI 1 process | Support four-layer MIMO Support a CSI 2 process |
| 3 | Support four-layer MIMO Support a CSI 1 process | Support four-layer MIMO Support a CSI 1 process | Support four-layer MIMO Support a CSI 1 process | Support four-layer MIMO Support a CSI 2 process |

TABLE 6-continued (carrier band class E)

| Sequence number | Carrier 1 | Carrier 2 | Carrier 3 | Carrier 4 |
|---|---|---|---|---|
| 4 | Support four-layer MIMO Support a CSI 1 process | Support four-layer MIMO Support a CSI 1 process | Support two-layer MIMO Support a CSI 1 process | Support eight-layer MIMO Support a CSI 2 process |
| 5 | Support two-layer MIMO Support a CSI 1 process | Support four-layer MIMO Support a CSI 1 process | Support two-layer MIMO Support a CSI 1 process | Support eight-layer MIMO Support a CSI 2 process |
| 6 | Support four-layer MIMO Support a CSI 1 process | Support four-layer MIMO Support a CSI 1 process | Support four-layer MIMO Support a CSI 1 process | Support eight-layer MIMO Support a CSI 2 process |
| 7 | Support four-layer MIMO Support a CSI 1 process | Support four-layer MIMO Support a CSI 1 process | Support eight-layer MIMO Support a CSI 1 process | Support eight-layer MIMO Support a CSI 1 process |
| 8 | Support eight-layer MIMO Support a CSI 1 process | Support eight-layer MIMO Support a CSI 1 process | Support eight-layer MIMO Support a CSI 1 process | Support eight-layer MIMO Support a CSI 1 process |

Likewise, content and a type quantity of capability information corresponding to a carrier in the predefined list are not limited in this embodiment. In the second implementation, two adjacent frequency bands may have consecutive sequence numbers. For example, the sequence numbers in Table 6 may be successively 6 to 13.

In this embodiment, the UE may report the capability information corresponding to each carrier in the carrier combination supported by the UE to the base station by using the following two implementations according to the sequence number predefined by the UE and the base station.

In a first implementation, the UE and the base station predefine a sequence number corresponding to a set including capability information corresponding to each carrier in the carrier combination, and the UE and the base station predefine that when a bit of a sequence number is set to a first value, it indicates that the UE supports capability information corresponding to each carrier in a set corresponding to the sequence number; and when a bit of a sequence number is set to a second value, it indicates that the UE does not support capability information corresponding to each carrier in a set corresponding to the sequence number.

For any set including capability information corresponding to carriers, when determining that the UE supports capability information corresponding to each carrier in the set, the UE sets a bit of a sequence number corresponding to the set to the first value; and when determining that the UE does not support capability information corresponding to each carrier in the set, the UE sets a bit of a sequence number corresponding to the set to the second value. Then the UE reports specified bits to the base station according to a sequence of sequence numbers corresponding to the bits.

For example, with reference to Table 3, if M is 9, the first value is 1, and the second value is 0, when the specified bits reported by the UE to the base station are 111100011, the base station may learn from Table 3 predefined by the base station and the UE that the UE supports capability information corresponding to each carrier in sets separately corresponding to sequence numbers 1, 2, 3, 4, 8, and 9 in Table 3, but the UE does not support capability information corresponding to each carrier in sets separately corresponding to sequence numbers 5, 6, and 7 in Table 3.

In a second implementation, the UE and the base station predefine a sequence number corresponding to a set including capability information corresponding to each carrier in the carrier combination. The UE reports a sequence number corresponding to a set including corresponding capability information supported by the UE to the base station. For example, with reference to Table 3, it is assumed that M is 9. After determining that the UE supports capability information corresponding to each carrier in sets separately corresponding to sequence numbers 1, 2, 3, 4, 8, and 9 in Table 3, the UE reports 123489 to the base station. After receiving this message, the base station may learn from Table 3 predefined by the base station and the UE that the UE supports the capability information corresponding to each carrier in the sets separately corresponding to the sequence numbers 1, 2, 3, 4, 8, and 9 in Table 3.

It should be noted that a type of a set including capability information corresponding to each carrier and a sequence number corresponding to the set are not limited to content provided in this embodiment, and may be other content, where the type of the set and the sequence number corresponding to the set are predefined by the UE and the base station. The first value and the second value predefined by the UE and the base station are not limited to values provided in this embodiment, and may be other values.

In this embodiment, optionally, before reporting capability information corresponding to a carrier to the base station, the UE may receive carrier range information sent by the base station. The carrier range information is used for instructing the UE to report the capability information corresponding to the carrier to the base station. The carrier range information includes at least one type of the following information:

an aggregation carrier bandwidth range, an aggregation carrier type, or an aggregation carrier quantity range.

The aggregation carrier bandwidth range may include a bandwidth range of aggregation of specified frequency bands or a total bandwidth range of aggregation of all frequency bands. For example, the aggregation carrier bandwidth range included in the carrier range information sent by the base station is as follows: A bandwidth range of a frequency band 1 is a carrier class B, or an upper bandwidth limit of the frequency band 1 is 20 M, and when the UE reports capability information corresponding to a carrier on the frequency band 1, the UE needs to report only capability information corresponding to a carrier within the carrier class B on the frequency band 1, or the UE needs to report only capability information corresponding to a carrier that has bandwidth within 20 M on the frequency band 1.

The aggregation carrier type may include a licensed carrier or an unlicensed carrier. For example, the aggregation carrier type included in the carrier range information sent by the base station is the licensed carrier, and when reporting capability information corresponding to a carrier, the UE needs to report only capability information corresponding to the licensed carrier.

The aggregation carrier quantity range may include a carrier quantity range of a specified aggregation frequency band, or a range of a sum of carrier data included in all aggregation frequency bands. For example, an upper limit of the carrier quantity range included in the carrier range information sent by the base station is 10, and the UE needs to report only capability information corresponding to a maximum of 10 carriers. Alternatively, the base station requires the UE to report capability information corresponding to a maximum of 10 carriers on a specified frequency band A, and the UE needs to report only capability information corresponding to a maximum of 10 carriers on the frequency band A. Optionally, when reporting capability information, the UE adds the carrier range information received from the base station to the capability information, so that when the capability information is transferred to another base station, the another base station learns that the capability information is reported for a carrier range. Optionally, before the UE receives the carrier range information sent by the base station, the UE reports information about a maximum carrier aggregation capability supported by the UE to the base station, and the information about the maximum carrier aggregation capability is used by the base station to send the carrier range information to the UE.

In this way, the UE may report capability information corresponding to a carrier to the base station according to the carrier range information sent by the base station. The UE does not need to report capability information corresponding to all carriers supported by the UE to the base station, so that reporting signaling waste is avoided.

In an embodiment, before the UE reports capability information corresponding to a carrier to the base station, the UE receives a capability reporting request sent by the base station, and the capability reporting request includes a first instruction. The UE reports, according to the first instruction by using a third set, determined capability information that is in capability information corresponding to each supported carrier combination and that meets a first condition. The first condition includes a carrier combination whose UE carrier capability is within a preset range and/or a carrier combination whose frequency band is an unlicensed frequency band. The third set is a set different from a first set and a second set.

Specifically, the UE fills, in the first set, determined capability information that is in the capability information corresponding to each supported carrier combination and that does not meet the first condition, and reports the capability information; and fills, in the third set, determined capability information that is in capability information corresponding to each carrier and that meets the first condition, and reports the capability information. Further, if the capability information that does not meet the first condition exceeds a maximum quantity of the first set, remaining capability information that does not meet the first set is filled in the third set and is reported.

The first instruction is an instruction for instructing the UE to report the third set or an instruction for instructing the UE to report a UE capability that meets the first condition.

Specifically, the third set is also used for reporting a carrier aggregation capability supported by the UE. A format of an element in the third set is different from a format of an element in the first set or the second set. The format of the element in the third set is a first format. The format of the element in the third set is more efficient, and can express more capabilities by using a smaller amount of information. For example, in the first set and the second set, each element is corresponding to a carrier combination in a frequency band combination and a MIMO capability or a CSI capability corresponding to the carrier combination. Each element can have only one MIMO/CSI capability combination. Each element in the third set is corresponding to a carrier combination in a frequency band combination, and each element may indicate multiple MIMO/CSI capability combinations. For another example, an element in the third set may indicate that a sub-combination corresponding to the element may also support a capability corresponding to the element. For example, if an element in the third set is a sub-combination that supports three carriers on a frequency band 1 and whose MIMO capability supports 4×4 MIMO and whose CSI capability supports two processes, it may also indicate that the element supports the two carriers on the frequency band 1, a MIMO capability of supporting 4×4 MIMO, and a CSI capability of supporting two processes. Therefore, an element in the third set can indicate a more complex capability, and more UE capability information may be reported by using a smaller quantity of elements. The carrier combination within the preset range includes a UE capability with a quantity of uplink carriers and/or downlink carriers that is greater than a specific quantity, for example, a carrier aggregation capability with a quantity of downlink carriers that is greater than 5.

Further, that the UE determines to report, according to the first instruction by using a third set, UE capability information that meets a first condition includes: The UE first fills the carrier aggregation capability of the UE in the first set, and then fills a remaining capability in the third set according to a format of the third set, and reports the remaining capability. Only a UE capability that does not meet the first condition is filled in the first set, or a UE capability that does not meet the first condition is preferentially filled in the first set.

Specifically, the UE first fills the carrier aggregation capability of the UE in the first set, fills the remaining capability in the third set according to the format of the third set, and reports the remaining capability. Only the UE capability that does not meet the first condition is filled in the first set, or the UE capability that does not meet the first condition is preferentially filled in the first set. If only the UE capability that does not meet the first condition is filled in the first set, even if the first set has remaining space, a UE capability that meets the first condition cannot be filled in the first set, and the UE capability that meets the first condition can be filled only in the third set. In this way, when a capability is transferred between base stations, a legacy base station uses only an element in the set 1, and a new base station uses an element in the set 1 and an element in the set 3.

For example, the first set has a maximum of three elements, and the third set has a maximum of 10 elements. UE capability information is shown in Table 8.

TABLE 8

| Index | Frequency band combination | First frequency band | Second frequency band | Third frequency band | MIMO capability | CSI capability |
|---|---|---|---|---|---|---|
| 1 | Frequency band 1 | Two carriers | | | Each carrier supports 2 × 2 MIMO | Each carrier supports two CSI processes |
| 2 | Frequency band 2 | Two carriers | | | Each carrier supports 2 × 2 MIMO | Each carrier supports two CSI processes |
| 3 | Frequency band 3 (unlicensed frequency band) | Two carriers | | | Each carrier supports 2 × 2 MIMO | Each carrier supports two CSI processes |
| 4 | Frequency band 1 + frequency band 2 | Two carriers | Two carriers | | Each carrier supports 2 × 2 MIMO | Each carrier supports two CSI processes |
| 5 | Frequency band 1 + frequency band 3 | Two carriers | Two carriers | | Each carrier supports 2 × 2 MIMO | Each carrier supports two CSI processes |
| 6 | Frequency band 2 + frequency band 3 | Two carriers | Two carriers | | Each carrier supports 2 × 2 MIMO | Each carrier supports two CSI processes |
| 7 | Frequency band 1 + frequency band 2 + frequency band 3 | Two carriers | Two carriers | Two carriers | Each carrier supports 2 × 2 MIMO | Each carrier supports two CSI processes |
| 8 | Frequency band 3 (unlicensed frequency band) | Two carriers | | | Each carrier supports 4 × 4 MIMO | Each carrier supports one CSI process |

The third element belongs to an unlicensed frequency band, and cannot be filled in the first set. Therefore, the first, second, and fourth elements are filled in the first set. The third, fifth, sixth, seventh, and eighth elements are filled in the third set. The seventh and eighth elements are corresponding to same frequency bands and same carrier combination capabilities, and only MIMO/CSI capabilities are different. Therefore, the seventh and eighth elements can be combined into one element in the third set for reporting. In aggregation of two carriers on the frequency band 3, two MIMO/CSI capability combinations may be supported.

In another embodiment, the capability reporting request further carries an indication of a frequency band range that needs to be reported. That the UE reports, according to the first instruction by using a third set, determined capability information that is in capability information corresponding to each supported carrier combination and that meets a first condition includes: The UE first fills, in the first set, capability information that is in the capability information corresponding to the frequency band range and that does not meet the first condition, and reports the capability information; if the first set cannot accommodate the capability information, the UE fills a remaining capability in the second set, and reports the remaining capability; and if the second set cannot accommodate the remaining capability, the UE fills the remaining capability in the third set according to a format of the third set, and reports the remaining capability. The UE fills, in the third set, determined capability information that is in capability information corresponding to each carrier and that meets the first condition, and reports the capability information.

Specifically, if the reporting request received by the UE further carries the indication of the frequency band range that needs to be reported, the UE first fills, in the first set, a carrier aggregation capability of the UE within the frequency band range, and fills a remaining capability in the second set. If the second set cannot accommodate the remaining capability, the UE fills the remaining capability in the third set according to the format of the third set and reports the remaining capability. Only a UE capability that does not meet the first condition is filled in the first set, or a UE capability that does not meet the first condition is preferentially filled in the first set. If only the UE capability that does not meet the first condition is filled in the first set, even if the first set has remaining space, a UE capability that meets the first condition cannot be filled in the first set, and the UE capability that meets the first condition can be filled only in the third set. When capability information is transferred between base stations, a legacy base station uses elements only in the set 1 and the set 2, and a new base station uses elements in the set 1, the set 2, and the set 3.

For example, UE capability information is shown in Table 9.

TABLE 9

| Index | Frequency band combination | First frequency band | Second frequency band | Third frequency band | MIMO capability | CSI capability |
|---|---|---|---|---|---|---|
| 1 | Frequency band 1 | Two carriers | | | Each carrier supports 2 × 2 MIMO | Each carrier supports two CSI processes |
| 2 | Frequency band 2 | Six carriers | | | Each carrier supports 4 × 4 MIMO | Each carrier supports two CSI processes |

TABLE 9-continued

| Index | Frequency band combination | First frequency band | Second frequency band | Third frequency band | MIMO capability | CSI capability |
|---|---|---|---|---|---|---|
| 3 | Frequency band 3 (unlicensed frequency band) | Two carriers | | | Each carrier supports 2 × 2 MIMO | Each carrier supports two CSI processes |
| 4 | Frequency band 1 + frequency band 2 | Two carriers | Two carriers | | Each carrier supports 2 × 2 MIMO | Each carrier supports two CSI processes |
| 5 | Frequency band 1 + frequency band 3 | Two carriers | Two carriers | | Each carrier supports 2 × 2 MIMO | Each carrier supports two CSI processes |
| 6 | Frequency band 2 + frequency band 3 | Two carriers | Two carriers | | Each carrier supports 2 × 2 MIMO | Each carrier supports two CSI processes |
| 7 | Frequency band 1 + frequency band 2 + frequency band 3 | Two carriers | Two carriers | Two carriers | Each carrier supports 2 × 2 MIMO | Each carrier supports two CSI processes |
| 8 | Frequency band 1 + frequency band 2 | Two carriers | Three carriers | | Each carrier supports 2 × 2 MIMO | Each carrier supports two CSI processes |
| 9 | Frequency band 1 + frequency band 2 | Two carriers | Four carriers | | Each carrier supports 2 × 2 MIMO | Each carrier supports one CSI process |
| 10 | Frequency band 5 | Two carriers | Four carriers | | Each carrier supports 2 × 2 MIMO | Each carrier supports one CSI process |
| 11 | Frequency band 1 + frequency band 2 | Two carriers | Three carriers | | Each carrier supports 4 × 2 MIMO | Each carrier supports two CSI processes |
| 12 | Frequency band 1 + frequency band 2 | Two carriers | Two carriers | | Each carrier supports 4 × 2 MIMO | Each carrier supports two CSI processes |

It is assumed that a combination that includes fewer than five carriers within a preset range is filled in the first set and the second set, the base station requests the UE to report frequency bands 1, 2, and 3, and a maximum element quantity of the first set and the second set is three. When filling a capability, the UE first selects a capability that has fewer than five carriers on a licensed frequency band, including 1, 4, and 8, to first fill the first set. Then the UE selects remaining capabilities that have fewer than five carriers on the licensed frequency band, including 11 and 12, to fill the second set. Then the UE fills, in the third set, remaining capabilities that belong to frequency bands 1, 2, and 3, including 2, 3, 4, 5, 6, and 7. 2, 3, 4, 5, 6, and 7 are filled according to a format of the set 3, and may be combined into a smaller quantity of elements.

Further, that the UE determines to report, according to the first instruction by using a third set, a UE capability that meets a first condition includes: The UE fills the carrier aggregation capability of the UE in the third set according to the format of the third set, reports the carrier aggregation capability of the UE, and does not report the first set or the second set, so that the base station generates the first set and/or the second set according to the third set, and reports the third set together with the first set and/or the second set to an MME.

Specifically, the UE does not fill the first set any longer, but directly fills the carrier aggregation capability of the UE in the third set according to the format of the third set, and reports the carrier aggregation capability of the UE to the base station. When a capability reported by the UE is transferred, by using a handover process or the MME, to a legacy base station that is incapable of identifying the third set, the legacy base station needs to re-request a UE capability, and the UE re-reports an element in the set 1 or elements in the set 1 and the set 2. To prevent the legacy base station from re-requesting reporting of the UE capability, the base station that receives the third set may generate a first set according to a format of the first set by using some elements in the third set, and then reports a capability formed by combining the first set and the third set to the MME, or transfers the capability to a target base station in the handover process. In this way, a UE capability stored in the MME or the target base station includes the first set and the third set. Even if a capability is subsequently transferred to the legacy base station that is incapable of identifying the third set, the legacy base station can parse a UE capability according to the first set in the UE capability, and does not need to request again the UE to report a capability.

Figure 7:
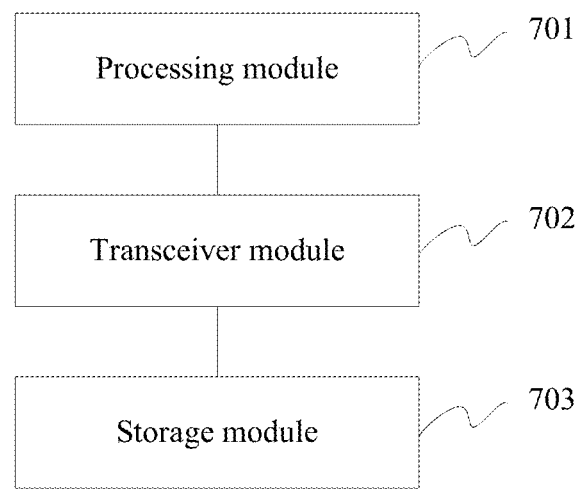
FIG. 7 is a schematic structural diagram of a carrier aggregation capability reporting apparatus according to an embodiment of the present invention.

As shown in FIG. 7, this embodiment of the present invention provides a carrier aggregation capability reporting apparatus, and the apparatus includes:

a processing module 701, configured to determine capability information corresponding to each carrier in a carrier combination supported by user equipment UE in which the apparatus is located, where the capability information includes a multiple-input multiple-output MIMO capability and/or a channel state information CSI capability; and a transceiver module 702, configured to report the capability information that is corresponding to each carrier and that is determined by the processing module 701 to a base station.

Optionally, the apparatus further includes:

a storage module 703, configured to store a sequence number predefined by the storage module 703 and the base station, where each predefined sequence number indicates a set including capability information corresponding to each carrier in the carrier combination.

When reporting the capability information that is corresponding to each carrier and that is determined by the processing module 701 to the base station, the transceiver module 702 is specifically configured to:

report the capability information that is corresponding to each carrier and that is determined by the processing module 701 to the base station according to the sequence number stored in the storage module 703.

Optionally, the sequence number that is predefined by the storage module 703 and the base station and that is stored in the storage module 703 is included in a same list, and the list includes all sets including capability information corresponding to each carrier in the carrier combination; or the sequence number that is predefined by the storage module 703 and the base station and that is stored in the storage module 703 is included in lists whose quantity is the same as a frequency band quantity of the carrier combination, and each list includes all sets including capability information corresponding to each carrier on a same frequency band.

Optionally, the processing module 701 is further configured to:

separately set, to a first value, a bit of a sequence number corresponding to a set including capability information that is corresponding to each carrier and that is supported by the UE, and set, to a second value, a bit of a sequence number corresponding to a set including capability information that is corresponding to each carrier and that is not supported by the UE.

When reporting the capability information that is corresponding to each carrier and that is determined by the processing module 701 to the base station according to the sequence number stored in the storage module 703, the transceiver module 702 is specifically configured to:

report bits that are set by the processing module 701 to the base station according to a sequence of sequence numbers corresponding to the bits.

Optionally, when reporting the capability information that is corresponding to each carrier and that is determined by the processing module 701 to the base station according to the sequence number stored in the storage module 703, the transceiver module 702 is specifically configured to:

report, to the base station, a sequence number corresponding to a set including capability information that is corresponding to each carrier and that is supported by the UE and determined by the processing module 701.

Optionally, the transceiver module 702 is further configured to:

receive carrier range information sent by the base station, where the carrier range information is used for instructing the transceiver module 702 to report the capability information corresponding to the carrier to the base station, and the carrier range information includes at least one type of the following information:

an aggregation carrier bandwidth range, an aggregation carrier type, or an aggregation carrier quantity range.

Optionally, before receiving the carrier range information sent by the base station, the transceiver module 702 is further configured to:

report information about a maximum carrier aggregation capability supported by the UE to the base station, where the information about the maximum carrier aggregation capability is used by the base station to send the carrier range information to the transceiver module 702.

In an embodiment, the transceiver module 702 is further configured to receive a capability reporting request sent by the base station, and the capability reporting request includes a first instruction. The processing module 701 is further configured to: report, according to the first instruction by using a third set, determined capability information that is in capability information corresponding to each supported carrier combination and that meets a first condition, and the first condition includes a carrier combination whose UE carrier capability is within a preset range and/or a carrier combination whose frequency band is an unlicensed frequency band. The third set is a set different from a first set and a second set.

Optionally, in an embodiment, the processing module 701 includes:

a first processing unit, configured to: fill, in the first set, determined capability information that is in the capability information corresponding to each supported carrier combination and that does not meet the first condition, and report the capability information; and a second processing module, configured to: fill, in the third set, determined capability information that is in capability information corresponding to each carrier and that meets the first condition, and report the capability information, where the second processing module is further configured to: if the capability information that does not meet the first condition exceeds a maximum quantity of the first set, fill, in the third set, remaining capability information that does not meet the first set, and report the remaining capability information.

In another embodiment, the capability reporting request further carries an indication of a frequency band range that needs to be reported, and the processing module 701 includes:

a first processing unit, configured to: fill, in the first set, capability information that is in the capability information corresponding to the frequency band range and that does not meet the first condition, and report the capability information;

a second processing unit, configured to: if the first set cannot accommodate the capability information, fill a remaining capability in the second set and report the remaining capability; and a third processing unit, configured to: fill, in the third set, determined capability information that is in capability information corresponding to each carrier and that meets the first condition, and report the capability information, where if the second set cannot accommodate the remaining capability, the third processing unit is further configured to: fill the remaining capability in the third set according to a format of the third set, and report the remaining capability.

In another embodiment, the processing module 701 is specifically configured to: fill, in the third set according to a format of the third set, the determined capability information corresponding to each carrier, and report the capability information to the base station, so that the base station generates the first set and/or the second set according to the third set, and reports the third set together with the first set and/or the second set to a mobility management entity MME.

Figure 8:
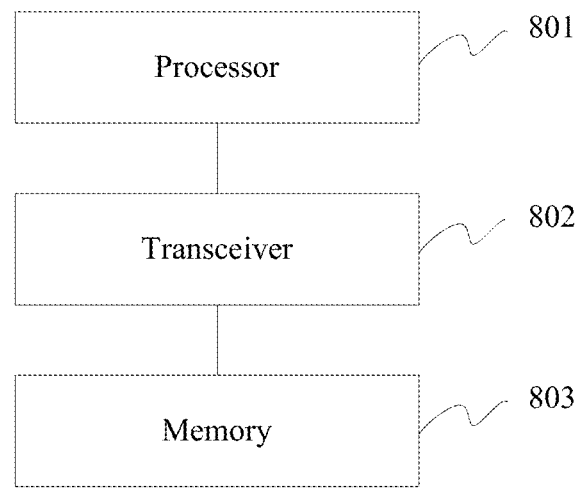
FIG. 8 is a schematic structural diagram of a carrier aggregation capability reporting apparatus according to an embodiment of the present invention.

As shown in FIG. 8, this embodiment of the present invention provides a carrier aggregation capability reporting apparatus, and the apparatus includes:

a processor 801, configured to determine capability information corresponding to each carrier in a carrier combination supported by user equipment UE in which the apparatus is located, where the capability information includes a multiple-input multiple-output MIMO capability and/or a channel state information CSI capability; and a transceiver 802, configured to report the capability information that is corresponding to each carrier and that is determined by the processor 801 to a base station.

Optionally, the apparatus further includes:

a memory 803, configured to store a sequence number predefined by the memory 803 and the base station, where each predefined sequence number indicates a set including capability information corresponding to each carrier in the carrier combination.

When reporting the capability information that is corresponding to each carrier and that is determined by the processor 801 to the base station, the transceiver 802 is specifically configured to:

report the capability information that is corresponding to each carrier and that is determined by the processor 801 to the base station according to the sequence number stored in the memory 803.

Optionally, the sequence number that is predefined by the memory 803 and the base station and that is stored in the memory 803 is included in a same list, and the list includes all sets including capability information corresponding to each carrier in the carrier combination; or the sequence number that is predefined by the memory 803 and the base station and that is stored in the memory 803 is included in lists whose quantity is the same as a frequency band quantity of the carrier combination, and each list includes all sets including capability information corresponding to each carrier on a same frequency band.

Optionally, the processor 801 is further configured to:

separately set, to a first value, a bit of a sequence number corresponding to a set including capability information that is corresponding to each carrier and that is supported by the UE, and set, to a second value, a bit of a sequence number corresponding to a set including capability information that is corresponding to each carrier and that is not supported by the UE.

When reporting the capability information that is corresponding to each carrier and that is determined by the processor 801 to the base station according to the sequence number stored in the memory 803, the transceiver 802 is specifically configured to:

report bits that are set by the processor 801 to the base station according to a sequence of sequence numbers corresponding to the bits.

Optionally, when reporting the capability information that is corresponding to each carrier and that is determined by the processor 801 to the base station according to the sequence number stored in the memory 803, the transceiver 802 is specifically configured to:

report, to the base station, a sequence number corresponding to a set including capability information that is corresponding to each carrier and that is supported by the UE and determined by the processor 801.

Optionally, the transceiver 802 is further configured to:

receive carrier range information sent by the base station, where the carrier range information is used for instructing the transceiver 802 to report the capability information corresponding to the carrier to the base station, and the carrier range information includes at least one type of the following information:

an aggregation carrier bandwidth range, an aggregation carrier type, or an aggregation carrier quantity range.

Optionally, before receiving the carrier range information sent by the base station, the transceiver 802 is further configured to:

report information about a maximum carrier aggregation capability supported by the UE to the base station, where the information about the maximum carrier aggregation capability is used by the base station to send the carrier range information to the transceiver 802.

In an embodiment, the transceiver 802 is further configured to receive a capability reporting request sent by the base station, and the capability reporting request includes a first instruction.

The processor 801 is further configured to: report, according to the first instruction by using a third set, determined capability information that is in capability information corresponding to each supported carrier combination and that meets a first condition, and the first condition includes a carrier combination whose UE carrier capability is within a preset range and/or a carrier combination whose frequency band is an unlicensed frequency band. The third set is a set different from a first set and a second set.

In an embodiment, the processor 801 is specifically configured to: fill, in a first set, determined capability information that is in capability information corresponding to each supported carrier combination and that does not meet a first condition, and report the capability information; if the capability information that does not meet the first condition exceeds a maximum quantity of the first set, fill, in a third set, remaining capability information that does not meet the first set, and report the remaining capability information; and fill, in the third set, determined capability information that is in capability information corresponding to each carrier and that meets the first condition, and report the capability information.

In an embodiment, the capability reporting request further carries an indication of a frequency band range that needs to be reported. The processor 801 is configured to: fill, in a first set, capability information that is in the capability information corresponding to the frequency band range and that does not meet a first condition, and report the capability information; if the first set cannot accommodate the capability information, fill a remaining capability in a second set, and report the remaining capability; if the second set cannot accommodate the remaining capability, fill the remaining capability in a third set according to a format of the third set, and report the remaining capabilities; and fill, in the third set, determined capability information that is in capability information corresponding to each carrier and that meets the first condition, and report the capability information.

In another embodiment, the processor 801 is specifically configured to: fill, in a third set according to a format of the third set, the determined capability information corresponding to each carrier, and report the capability information to the base station, so that the base station generates a first set and/or a second set according to the third set, and reports the third set together with the first set and/or the second set to a mobility management entity MME.

In this embodiment, the user equipment UE reports the determined capability information corresponding to each carrier in the carrier combination to the base station, so that the base station can thoroughly learn the capability information corresponding to each carrier in the carrier combination supported by the UE. By means of predefining performed by the UE and the base station, content of capability information that is corresponding to a carrier and that is reported by the UE to the base station is simplified, so that reporting signaling overheads are reduced. The UE reports, according to the carrier range information sent by the base station, the capability information corresponding to the carrier to the base station, and the UE does not need to report capability information corresponding to all carriers supported by the UE to the base station, so that reporting signaling waste is avoided.

Embodiment 3

Figure 9:
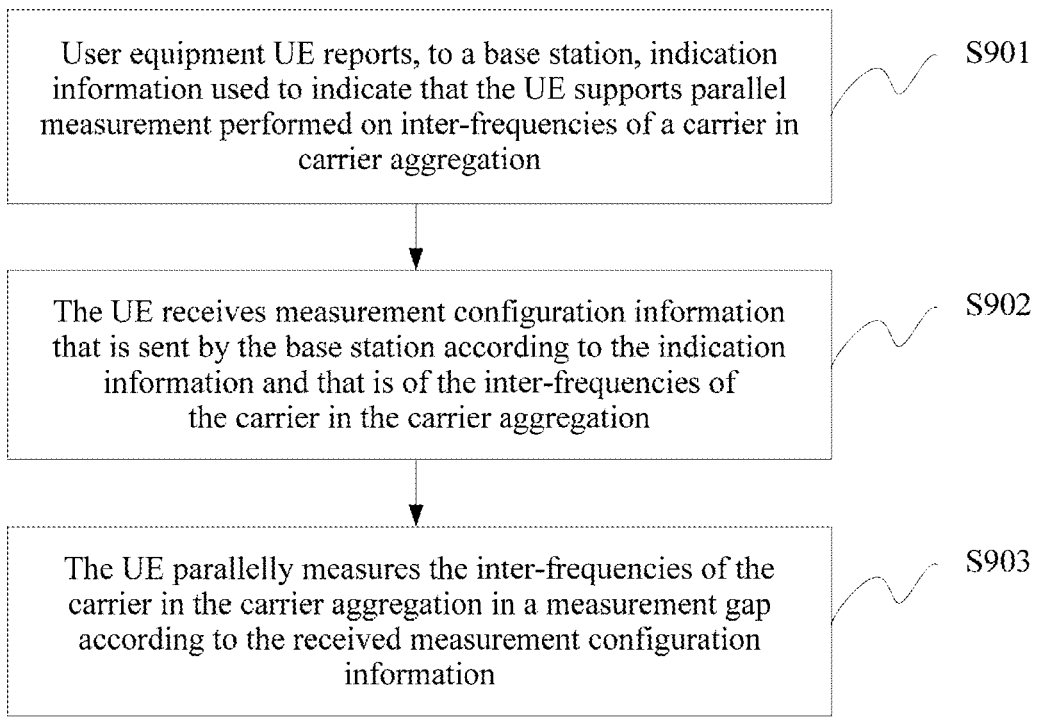
FIG. 9 is a schematic flowchart of a carrier measurement method according to an embodiment of the present invention.

As shown in FIG. 9, this embodiment of the present invention provides a carrier measurement method, and the method is executed by UE and includes the following steps:

S901. The user equipment UE reports, to a base station, indication information used to indicate that the UE supports parallel measurement performed in a measurement gap on inter-frequencies of a carrier in carrier aggregation supported by the UE.

S902. The UE receives measurement configuration information of the inter-frequencies of the carrier in the carrier aggregation supported by the UE and that is sent by the base station according to the indication information.

S903. The UE parallelly measures, in the measurement gap according to the received measurement configuration information, the inter-frequencies of the carrier in the carrier aggregation supported by the UE.

Before the UE performs a measurement task, the base station sends a measurement control message to the UE. The measurement control message includes information such as a measurement identifier, a measurement object, and report configuration. The measurement identifier is used to identify measurement control information. The measurement object may include a center frequency of a carrier (that is, an absolute radio frequency channel number (Absolute Radio Frequency Channel Number, ARFCN)), a neighboring cell list of the carrier, and the like. The report configuration may include an event trigger reporting condition, an event trigger reporting period, and the like. The measurement object and the report configuration are used by the UE to perform the measurement task. The UE generates a measurement report according to a measurement result of the measurement task, and sends the measurement report to the base station.

The measurement task of the UE is classified into intra-frequency measurement and inter-frequency measurement according to different carriers on which measurement objects of the UE are located. A measurement task in which a carrier of a measurement object is the same as a carrier on which a serving cell of the UE is located is referred to as the intra-frequency measurement. A measurement task in which a carrier of a measurement object is different from a carrier on which a serving cell of the UE is located is referred to as the inter-frequency measurement. The carrier on which the serving cell of the UE is located may be considered as a center frequency at which the UE communicates with the serving cell. An inter-frequency measurement task does not include a measurement task in an evolved packet core network (EPC for short), for example, a measurement task in which a measurement object is a Universal Mobile Telecommunications System (UMTS for short).

For the intra-frequency measurement, the UE may directly perform measurement, and the base station does not need to configure a measurement gap (measurement gap) for the UE. For the inter-frequency measurement, the base station needs to configure a measurement gap for the UE. The measurement gap is a time interval. In the time interval, the base station does not schedule the UE, and the UE temporarily interrupts the communication with the serving cell, so that the UE performs an inter-frequency measurement task. The base station determines, according to capability information reported by the UE, whether there is a need to configure the measurement gap for the UE. The base station may configure the measurement gap for the UE by using a radio resource control (RRC for short) reconfiguration message. For example, the capability information of the UE is shown in Table 7. When the UE operates on a frequency band X1, the base station needs to configure a measurement gap for the UE when the UE measures a frequency band Y1. When the UE operates on a frequency band (X2+X3), the base station does not need to configure a measurement gap for the UE when the UE measures a frequency band Y2.

TABLE 10

| Operating band | Measurement band | Whether a gap is required |
| --- | --- | --- |
| X1 | Y1 | Yes |
| X2 + X3 | Y2 | No |

In this embodiment, the UE reports, to the base station, the indication information used to indicate that the UE supports the parallel measurement performed in the measurement gap on the inter-frequencies of the carrier in the carrier aggregation supported by the UE. After the UE reports a carrier aggregation capability to the base station, the base station determines the measurement configuration information of the inter-frequencies of the carrier in the carrier aggregation of the UE according to the indication information and the carrier aggregation capability of the UE, then sends the measurement configuration information to the UE, and configures the measurement gap for the UE. The UE parallelly measures the inter-frequencies of the carrier in the carrier aggregation in the measurement gap according to the measurement configuration information. The measurement configuration information includes information about the inter-frequencies of the carrier in the carrier aggregation supported by the UE.

In this embodiment, optionally, the UE receives an RRC reconfiguration message sent by the base station, and the RRC reconfiguration message carries the measurement configuration information that is sent by the base station according to the indication information and that is of the inter-frequencies of the carrier in the carrier aggregation.

Figure 10:
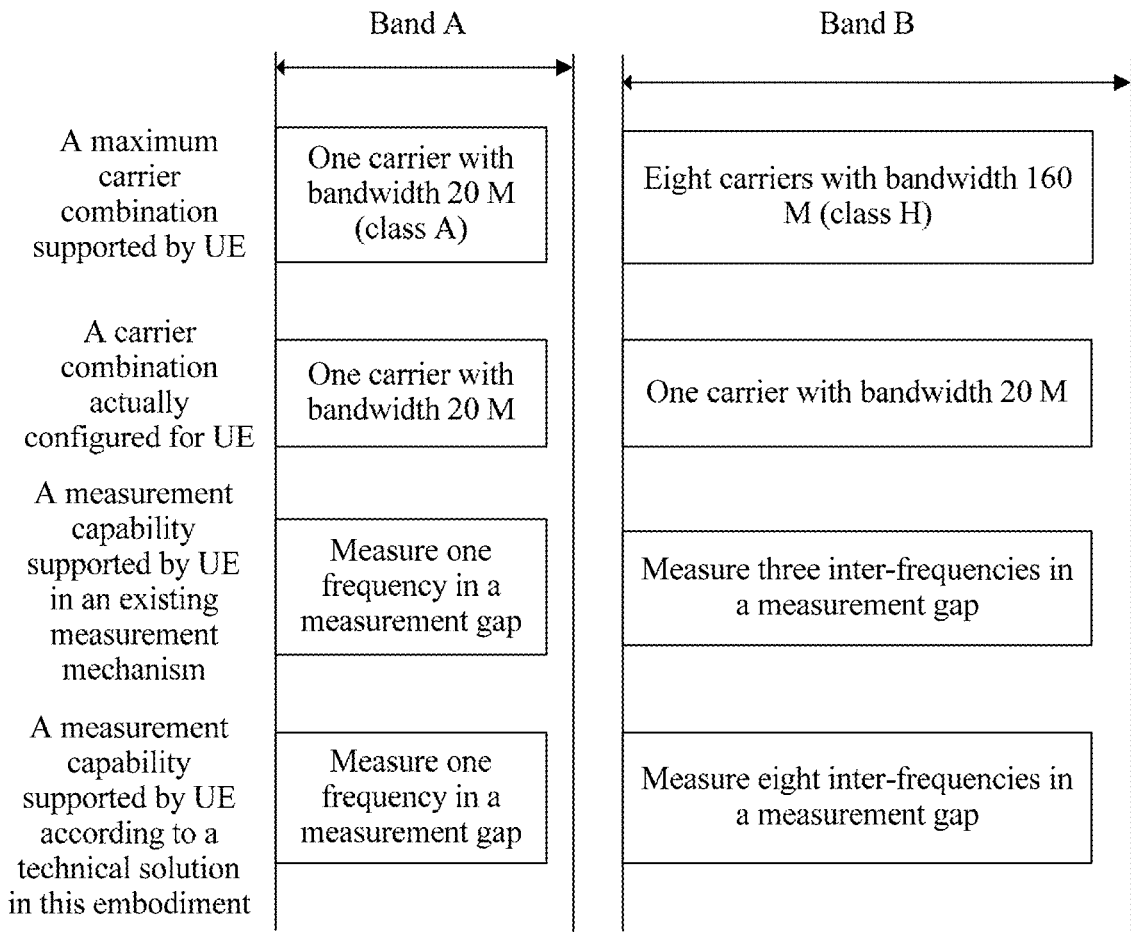
FIG. 10 is a schematic diagram of measuring inter-frequencies of a carrier in carrier aggregation supported by UE according to an embodiment of the present invention.

For example, as shown in FIG. 10, the UE supports a carrier combination Band A+Band B (1+8), a frequency band A includes one frequency, and a frequency band B includes eight frequencies. After the UE reports, to the base station, the indication information used to indicate that the UE supports parallel measurement performed on the inter-frequencies of the carrier in the carrier aggregation, the base station learns that the UE supports parallel measurement performed on the inter-frequencies of the carrier in the carrier aggregation. The measurement configuration information configured by the base station for the UE may include at most all frequencies in the carrier combination supported by the UE. That is, the measurement configuration information configured by the base station for the UE includes at most the one frequency on the frequency band A and the eight frequencies on the Band B. After receiving the measurement configuration information, the UE may parallelly measure, in the measurement gap configured by the base station for the UE, the inter-frequencies that are of the carrier in the carrier aggregation and that are included in the measurement configuration information.

Figure 11:
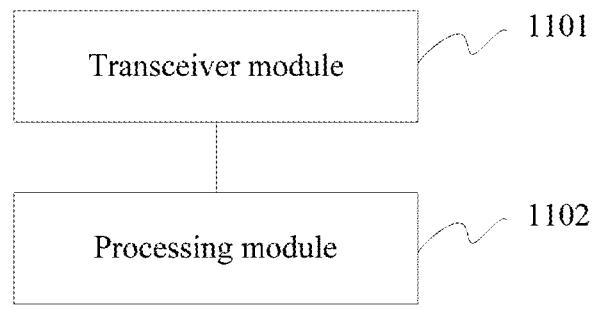
FIG. 11 is a schematic structural diagram of a carrier measurement apparatus according to an embodiment of the present invention.

As shown in FIG. 11, this embodiment of the present invention provides a carrier measurement apparatus, and the apparatus includes:

a transceiver module 1101, configured to: report indication information to a base station, where the indication information is used to indicate that user equipment UE in which the apparatus is located supports parallel measurement performed in a measurement gap on inter-frequencies of a carrier in carrier aggregation supported by the UE; and receive measurement configuration information that is sent by the base station according to the indication information and that includes the inter-frequencies of the carrier in the carrier aggregation supported by the UE; and a processing module 1102, configured to parallelly measure, in the measurement gap according to the measurement configuration information received by the transceiver module 1101, the inter-frequencies of the carrier in the carrier aggregation supported by the UE.

Optionally, when receiving the measurement configuration information that is sent by the base station according to the indication information and that includes the inter-frequencies of the carrier within the carrier aggregation range supported by the UE, the transceiver module 1101 is specifically configured to:

receive a radio resource control RRC reconfiguration message sent by the base station, where the RRC reconfiguration message carries the measurement configuration information that is sent by the base station according to the indication information and that is of the inter-frequencies of the carrier in the carrier aggregation supported by the UE.

Figure 12:
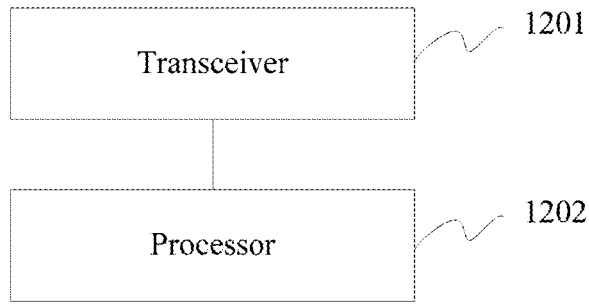
FIG. 12 is a schematic structural diagram of a carrier measurement apparatus according to an embodiment of the present invention.

As shown in FIG. 12, this embodiment of the present invention provides a carrier measurement apparatus, and the apparatus includes:

a transceiver 1201, configured to: report indication information to a base station, where the indication information is used to indicate that user equipment UE in which the apparatus is located supports parallel measurement performed in a measurement gap on inter-frequencies of a carrier in carrier aggregation supported by the UE; and receive measurement configuration information that is sent by the base station according to the indication information and that includes the inter-frequencies of the carrier in the carrier aggregation supported by the UE; and a processor 1202, configured to parallelly measure, in the measurement gap according to the measurement configuration information received by the transceiver 1201, the inter-frequencies of the carrier in the carrier aggregation supported by the UE.

Optionally, when receiving the measurement configuration information that is sent by the base station according to the indication information and that includes the inter-frequencies of the carrier within the carrier aggregation range supported by the UE, the transceiver 1201 is specifically configured to:

receive a radio resource control RRC reconfiguration message sent by the base station, where the RRC reconfiguration message carries the measurement configuration information that is sent by the base station according to the indication information and that is of the inter-frequencies of the carrier in the carrier aggregation supported by the UE.

Figure 13:
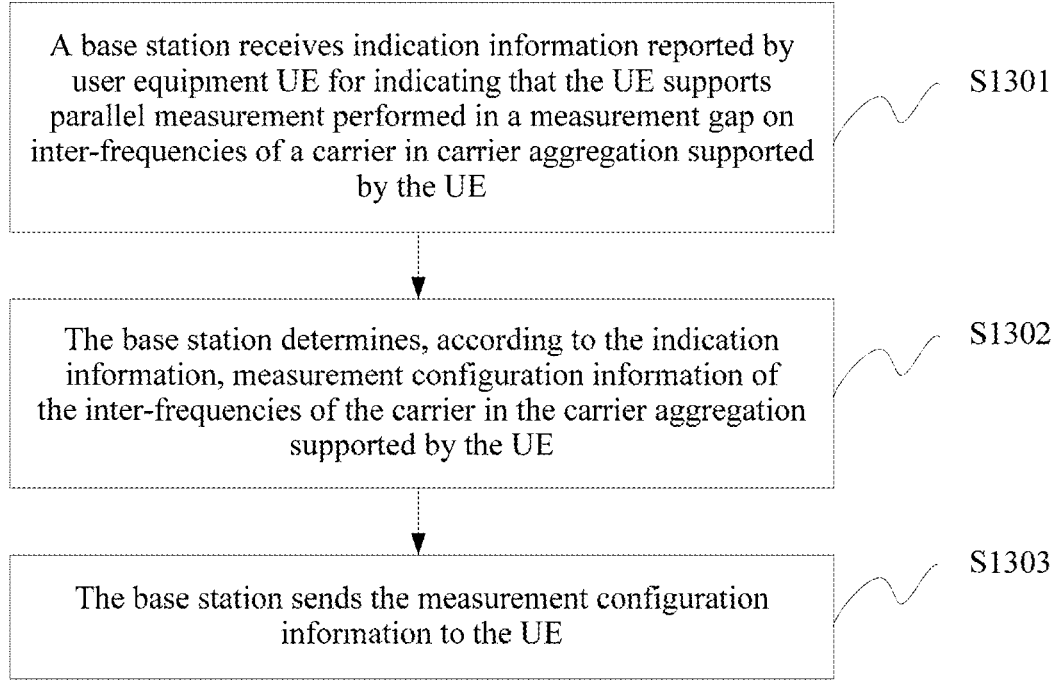
FIG. 13 is a schematic flowchart of a carrier measurement method according to an embodiment of the present invention.

As shown in FIG. 13, this embodiment of the present invention provides a carrier measurement method. The method is executed by a base station, and the method includes the following steps:

S1301. The base station receives indication information reported by user equipment UE for indicating that the UE supports parallel measurement performed in a measurement gap on inter-frequencies of a carrier in carrier aggregation supported by the UE.

S1302. The base station determines, according to the indication information, measurement configuration information of the inter-frequencies of the carrier in the carrier aggregation supported by the UE.

S1303. The base station sends the measurement configuration information to the UE.

In this embodiment, the base station receives the indication information sent by the UE for indicating that the UE supports the parallel measurement performed in the measurement gap on the inter-frequencies of the carrier in the carrier aggregation. After receiving a carrier aggregation capability reported by the UE, the base station determines the measurement configuration information of the inter-frequencies of the carrier in the carrier aggregation of the UE according to the indication information and the carrier aggregation capability supported by the UE, and sends the measurement configuration information to the UE. Further, the UE parallelly measures the inter-frequencies of the carrier in the carrier aggregation in the measurement gap according to the measurement configuration information. The measurement configuration information includes information about the inter-frequencies of the carrier in the carrier aggregation.

In this embodiment, optionally, the base station sends a radio resource control RRC reconfiguration message to the UE, and the RRC reconfiguration message carries the measurement configuration information that is sent by the base station according to the indication information and that is of the inter-frequencies of the carrier in the carrier aggregation.

Figure 14:
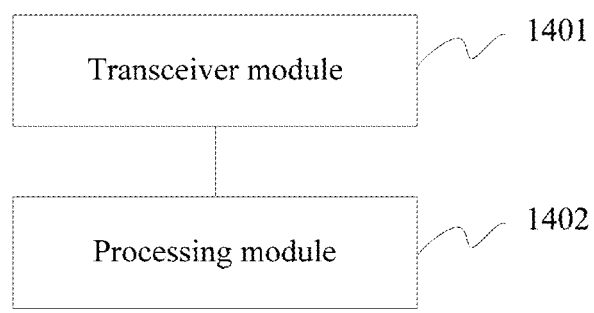
FIG. 14 is a schematic structural diagram of a carrier measurement apparatus according to an embodiment of the present invention.

As shown in FIG. 14, this embodiment of the present invention provides a carrier measurement apparatus, and the apparatus includes:

a transceiver module 1401, configured to receive indication information reported by user equipment UE, where the indication information is used to indicate that the UE supports parallel measurement performed in a measurement gap on inter-frequencies of a carrier in carrier aggregation supported by the UE; and a processing module 1402, configured to determine, according to the indication information received by the transceiver module 1401, measurement configuration information of the inter-frequencies of the carrier in the carrier aggregation supported by the UE.

The transceiver module 1401 is further configured to send the measurement configuration information determined by the processing module 1402 to the UE.

Optionally, when sending the measurement configuration information determined by the processing module 1402 to the UE, the transceiver module 1401 is specifically configured to:

send a radio resource control RRC reconfiguration message to the UE, where the RRC reconfiguration message carries the measurement configuration information.

Figure 15:
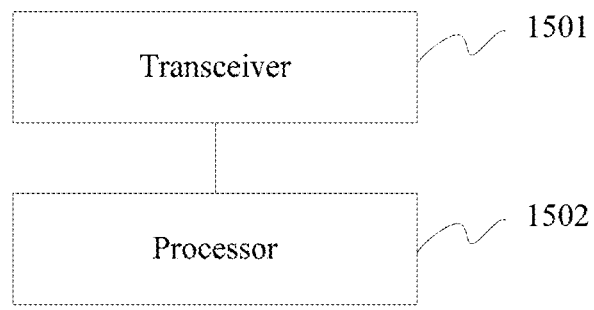
FIG. 15 is a schematic structural diagram of a carrier measurement apparatus according to an embodiment of the present invention.

As shown in FIG. 15, this embodiment of the present invention provides a carrier measurement apparatus, and the apparatus includes:

a transceiver 1501, configured to receive indication information reported by user equipment UE, where the indication information is used to indicate that the UE supports parallel measurement performed in a measurement gap on inter-frequencies of a carrier in carrier aggregation supported by the UE; and a processor 1502, configured to determine, according to the indication information received by the transceiver 1501, measurement configuration information of the inter-frequencies of the carrier in the carrier aggregation supported by the UE.

The transceiver 1501 is further configured to send the measurement configuration information determined by the processor 1502 to the UE.

Optionally, when sending the measurement configuration information determined by the processor 1502 to the UE, the transceiver 1501 is specifically configured to:

send a radio resource control RRC reconfiguration message to the UE, where the RRC reconfiguration message carries the measurement configuration information.

In this embodiment, the UE sends, to the base station, the indication information used to indicate that the UE supports the parallel measurement performed on the inter-frequencies of the carrier in the carrier aggregation. The base station determines the measurement configuration information of the inter-frequencies of the carrier in the carrier aggregation of the UE according to the indication information, and then the base station sends the measurement configuration information to the UE. The UE parallelly measures the inter-frequencies of the carrier in the carrier aggregation in the measurement gap according to the measurement configuration information. The measurement configuration information includes the information about the inter-frequencies of the carrier in the carrier aggregation. Therefore, the UE can parallelly measure all inter-frequencies in the carrier aggregation supported by the UE, so as to prevent the UE from parallelly measuring, in an existing measurement mechanism, only three inter-frequencies in the carrier aggregation supported by the UE. According to the technical method in this embodiment, a quantity of inter-frequencies that are in the carrier aggregation supported by the UE and that are parallelly measured by the UE can be increased.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Persons skilled in the art can make various modifications and variations to the embodiments of the present invention without departing from the spirit and scope of the embodiments of the present invention. The disclosure is intended to cover these modifications and variations provided that they fall within the scope of protection defined by the following claims and their equivalent technologies.

What is claimed is:

1. An apparatus, the apparatus comprising one or more processors configured to:

receive a capability reporting request from a base station, wherein the capability reporting request carries an indication of a frequency band range that needs to be reported;

receive carrier range information of a band from the base station, wherein the carrier range information comprises a maximum carrier quantity;

determine, according to the carrier range information, capability information corresponding to at least one carrier in the band, wherein a quantity of carriers of the least one carrier is less than or equal to the maximum carrier quantity, and wherein the capability information comprises at least one of a multiple-input multiple-output (MIMO) capability or a channel state information (CSI) capability; and report the capability information corresponding to the at least one carrier to the base station, wherein the maximum carrier quantity is included in the capability information reported to the base station, wherein reporting the capability information corresponding to the at least one carrier to the base station comprises:

filling, in a first set, capability information that is in capability information corresponding to the frequency band range and that does not meet a first condition, and reporting the capability information, wherein when the first set cannot accommodate the capability information, filling a remaining capability in a second set, and reporting the remaining capability, and wherein when the second set cannot accommodate the remaining capability, filling the remaining capability in a third set according to a format of the third set, and reporting the remaining capability; and filling, in the third set, capability information that is in capability information corresponding to each supported carrier combination and that meets the first condition, and reporting the capability information.

2. The apparatus according to claim 1, wherein the one or more processors are further configured to:

report information about a maximum carrier aggregation capability supported by a user equipment (UE) to the base station, wherein the information about the maximum carrier aggregation capability is used by the base station to send the carrier range information to the transceiver.

3. The apparatus according to claim 1, wherein the capability reporting request further comprises a first instruction, and wherein the one or more processors are further configured to:

report, according to the first instruction by using the third set, the capability information that is in the capability information corresponding to each supported carrier combination and that meets the first condition, wherein the first condition comprises at least one of the following: (a) a carrier combination whose user equipment (UE) carrier capability is within a preset range, or (b) a carrier combination whose frequency band is an unlicensed frequency band;

wherein the third set is a set different from the first set and the second set.

4. The apparatus according to claim 1, wherein the carrier range information further comprises a maximum carrier bandwidth, and a total bandwidth of the at least one carrier is less than or equal to the maximum carrier bandwidth.

5. The apparatus according to claim 1, wherein the capability information carries an index indicating a capability information set including first capability information of each carrier of the at least carrier in the band.

6. A method applied in a user equipment (UE), the method comprising:

receiving a capability reporting request from a base station, wherein the capability reporting request carries an indication of a frequency band range that needs to be reported;

receiving carrier range information of a band from the base station, wherein the carrier range information comprises a maximum carrier quantity;

determining, according to the carrier range information, capability information corresponding to at least one carrier in the band, wherein a quantity of carriers of the least one carrier is less than or equal to the maximum carrier quantity, and wherein the capability information comprises at least one of a multiple-input multiple-output (MIMO) capability or a channel state information (CSI) capability; and reporting, to the base station, the capability information corresponding to the at least one carrier, wherein the maximum carrier quantity is included in the capability information reported to the base station, wherein reporting the capability information corresponding to the at least one carrier comprises:

filling, in a first set, capability information that is in capability information corresponding to the frequency band range and that does not meet a first condition, and reporting the capability information, wherein when the first set cannot accommodate the capability information, filling a remaining capability in a second set, and reporting the remaining capability, and wherein when the second set cannot accommodate the remaining capability, filling the remaining capability in a third set according to a format of the third set, and reporting the remaining capability; and filling, in the third set, capability information that is in capability information corresponding to each supported carrier combination and that meets the first condition, and reporting the capability information.

7. The method according to claim 6, wherein before the receiving the carrier range information from the base station, the method further comprises:

reporting information about a maximum carrier aggregation capability supported by the UE to the base station, wherein the information about the maximum carrier aggregation capability is used by the base station to send the carrier range information to the UE.

8. The method according to claim 6, wherein the capability reporting request further comprises a first instruction, the method further comprising:

reporting, according to the first instruction by using the third set, the capability information that is in the capability information corresponding to each supported carrier combination and that meets the first condition, wherein the first condition comprises at least one of the following: (a) a carrier combination whose UE carrier capability is within at least one of a preset range, or (b) a carrier combination whose frequency band is an unlicensed frequency band;

wherein the third set is a set different from the first set and the second set.

9. The method according to claim 6, wherein the carrier range information further comprises a maximum carrier bandwidth, and a total bandwidth of the at least one carrier is less than or equal to the maximum carrier bandwidth.

10. The method according to claim 6, wherein the capability information carries an index indicating a capability information set including first capability information of each carrier of the at least carrier in the band.

11. A method applied in a base station, the method comprising:

sending a capability reporting request to a user equipment (UE), wherein the capability reporting request carries an indication of a frequency band range that needs to be reported;

sending carrier range information of a band to the UE, wherein the carrier range information comprises a maximum carrier quantity; and receiving capability information corresponding to at least one carrier in the band, wherein a quantity of carriers of the least one carrier is less than or equal to the maximum carrier quantity, and the capability information comprises the maximum carrier quantity;

wherein the capability information comprises capability information corresponding to the frequency band range and that does not meet a first condition that is filled in a first set, wherein when the first set cannot accommodate the capability information, a remaining portion of the capability information is filled in a second set, and wherein when the second set cannot accommodate the remaining portion of the capability information, the remaining portion of the capability information is filled in a third set according to a format of the third set; and wherein capability information that is in capability information corresponding to each supported carrier combination and that meets the first condition is filled in the third set.

12. The method according to claim 11, further comprising:
receiving, from the UE, information about a maximum carrier aggregation capability supported by the UE; and
determining to send the carrier range information according to the information about the maximum carrier aggregation capability.

13. The method according to claim 11, wherein the capability reporting request further comprises a first instruction, the method further comprising:
receiving, according to the first instruction, the capability information that is in the capability information corresponding to each supported carrier combination and that meets the first condition, wherein the first condition comprises at least one of the following: (a) a carrier combination whose UE carrier capability is within a preset range, or (b) a carrier combination whose frequency band is an unlicensed frequency band;
wherein the third set is a set different from the first set and the second set.

14. The method according to claim 11, wherein the carrier range information further comprises a maximum carrier bandwidth, and a total bandwidth of the at least one carrier is less than or equal to the maximum carrier bandwidth.

15. The method according to claim 11, wherein the capability information carries an index indicating a capability information set including first capability information of each carrier of the at least carrier in the band.

16. A non-transitory computer-readable storage medium having a program recorded thereon, wherein the program when executed by a computer causes the computer to execute the following:
receiving a capability reporting request from a base station, wherein the capability reporting request carries an indication of a frequency band range that needs to be reported;
receiving carrier range information of a band from the base station, wherein the carrier range information comprises a maximum carrier quantity;
determining, according to the carrier range information, capability information corresponding to at least carrier in the band, wherein a quantity of carriers of the least one carrier is less than or equal to the maximum carrier quantity, and wherein the capability information comprises at least one of a multiple-input multiple-output (MIMO) capability or a channel state information (CSI) capability; and
reporting, to the base station, the capability information corresponding to the at least one carrier, wherein the maximum carrier quantity is included in the capability information reported to the base station, wherein reporting the capability information corresponding to the at least one carrier comprises:
filling, in a first set, capability information that is in capability information corresponding to the frequency band range and that does not meet a first condition, and reporting the capability information, wherein when the first set cannot accommodate the capability information, filling a remaining capability in a second set, and reporting the remaining capability, and wherein when the second set cannot accommodate the remaining capability, filling the remaining capability in a third set according to a format of the third set, and reporting the remaining capability; and
filling, in the third set, capability information that is in capability information corresponding to each supported carrier combination and that meets the first condition, and reporting the capability information.

17. The non-transitory computer-readable storage medium according to claim 16, wherein the carrier range information further comprises a maximum carrier bandwidth, and a total bandwidth of the at least one carrier is less than or equal to the maximum carrier bandwidth.

18. The non-transitory computer-readable storage medium according to claim 16, wherein the capability information carries an index indicating a capability information set including first capability information of each carrier of the at least carrier in the band.

* * * * *